(12) United States Patent
Janneteau et al.

(10) Patent No.: US 7,430,174 B2
(45) Date of Patent: Sep. 30, 2008

(54) DATA FLOW BETWEEN A COMMUNICATION NODE AND A MOBILE NODE IN A MOBILE NETWORK

(75) Inventors: Christophe Janneteau, Bois d'Arcy (FR); Alexis Olivereau, Orsay (FR); Alexandru Petrescu, Orsay (FR); Hong-Yon Lach, Charenton-le-Pont (FR)

(73) Assignee: Motorola, Inc., Schaumburg, IL (US)

( * ) Notice: Subject to any disclaimer, the term of this patent is extended or adjusted under 35 U.S.C. 154(b) by 592 days.

(21) Appl. No.: 10/518,140

(22) PCT Filed: Jun. 11, 2003

(86) PCT No.: PCT/EP03/06209

§ 371 (c)(1),
(2), (4) Date: Dec. 10, 2004

(87) PCT Pub. No.: WO04/002106

PCT Pub. Date: Dec. 31, 2003

(65) Prior Publication Data

US 2005/0226189 A1    Oct. 13, 2005

(30) Foreign Application Priority Data

Jun. 19, 2002    (EP)    ................................ 02291523

(51) Int. Cl.
*H04L 1/00* (2006.01)

(52) U.S. Cl. ................. 370/238; 370/248; 370/254; 370/255

(58) Field of Classification Search ............... 370/248, 370/249, 475, 238, 254, 255
See application file for complete search history.

(56) References Cited

U.S. PATENT DOCUMENTS

| | | | | |
|---|---|---|---|---|
| 5,095,480 A | * | 3/1992 | Fenner | ............... 370/238 |
| 5,347,450 A | * | 9/1994 | Nugent | ............... 709/243 |
| 5,854,899 A | * | 12/1998 | Callon et al. | ............... 709/238 |
| 5,883,891 A | * | 3/1999 | Williams et al. | ............... 370/356 |
| 5,920,697 A | * | 7/1999 | Masters et al. | ............... 709/219 |

(Continued)

FOREIGN PATENT DOCUMENTS

| EP | 0 578 041 A | 1/1994 |
|---|---|---|
| EP | 0 189 411 A | 3/2002 |
| WO | WO 01/31822 A | 5/2001 |

OTHER PUBLICATIONS

Thierry Ernst, "Network Mobility Support in IPv6", A thesis in fulfillment of the requirement for the degree of Doctor Philosophy to the Department of Mathematics and Computer Science, Universite Joseph Fourier, France, Oct. 29, 2001.*

(Continued)

*Primary Examiner*—Kwang B. Yao
*Assistant Examiner*—Andrew Lai
(74) *Attorney, Agent, or Firm*—Jeffrey K. Jacobs; Brian M. Mancini

(57) ABSTRACT

A method of transmitting a data packet on a communication path from a first communication node (CN1, CN2) to a second communication node (LFN1, LFN2) in a mobile network (115). The method includes receiving a route message (1010, 1020) from the second communication node, wherein the route message includes a list of intermediary addresses ({MR1-COA}, {MR1-COA, MR2-COA}) between the first communication node and the second communication node. A preferred communication path is generated in response to the list of intermediary addresses; and at least one data packet is transmitted from the first communication node to the second communication node via this preferred communication path. In this matter, an optimized data path is determined in order to send at least one data packet to an intended recipient (LFN1, LFN2), for example in a nested mobile network scenario.

19 Claims, 20 Drawing Sheets

U.S. PATENT DOCUMENTS

| | | | | |
|---|---|---|---|---|
| 5,940,379 | A * | 8/1999 | Startup et al. | 370/320 |
| 6,097,703 | A * | 8/2000 | Larsen et al. | 370/254 |
| 6,587,438 | B1 * | 7/2003 | Brendel | 370/238 |
| 6,587,882 | B1 * | 7/2003 | Inoue et al. | 709/227 |
| 6,799,204 | B1 * | 9/2004 | Baba et al. | 709/220 |
| 6,990,111 | B2 * | 1/2006 | Lemoff et al. | 370/400 |
| 2001/0042070 | A1 * | 11/2001 | Jinzaki | 707/104.1 |
| 2002/0015386 | A1 * | 2/2002 | Kajiwara | 370/248 |
| 2002/0159463 | A1 * | 10/2002 | Wang | 370/401 |
| 2002/0191593 | A1 * | 12/2002 | O'Neill et al. | 370/352 |
| 2003/0007475 | A1 * | 1/2003 | Tsuda et al. | 370/338 |

OTHER PUBLICATIONS

Ernst, "Network Mobility Support in IPv6", A thesis presented in fulfillment of the requirements for the degree of Doctor of Philosophy to the Department of Mathematics and Computer Science at Universite Joseph Fourier, France, Oct. 29, 2001. (Note: This document was already provided to Applicant in previous Office action).*

Ernst, "Network Mobility Support in IPv6", A thesis present in fulfillment of the requirement for hte degree of Doctor of Philosophy to the Department of Mathmatics and Computer Science at Universite Joseph Fourier, France, Oct. 29, 2001. (Note: This document was already provided to Applicant in previous Office Action).*

Thierry, Ernst: "network Mobility Support in IPv6", Thesis Department of Mathematics and Computer Science of Universite Joseph Fourier, [Online], Oct. 29, 2001, pp. 5-99, <URL:www.inria.fr>.

Perkins, C.E.: "Mobile Networking in the Internet", Mobile Networks and Applications, Baltzer Science Publishers, Bussum, NL, vol. 3, 1998, pp. 319-334.

Hu, Y-C, et al.: "Caching Strategies in On-Demand Routing Protocols for Wireless Ad Hoc Networks", Mobicom. Proceedings of the Annual International Conference on Mobile Computing and Networking, XX, XX, Aug. 6, 2000, pp. 231-242.

Okajima, I, et al.: "Architecture and mobile IPv6 extensions supporting mobile networks in mobile communications", VTC Fall 2001. IEEE 54th, Vehicular Technology Conference Proceedings. Atlantic City, NJ, Oct. 7-11, 2001, IEEE Vehicular Technology Conference, New York, NY: IEEE, US, vol. 1 of 4, Conf. 54, Oct. 7, 2001, pp. 2533-2537.

Narten, T. et al.: "RFC 2461: Neighbor Discovery for IP Version 6", IETF Request for Comments, XX, XX, Dec. 1998, pp. 1-93.

* cited by examiner

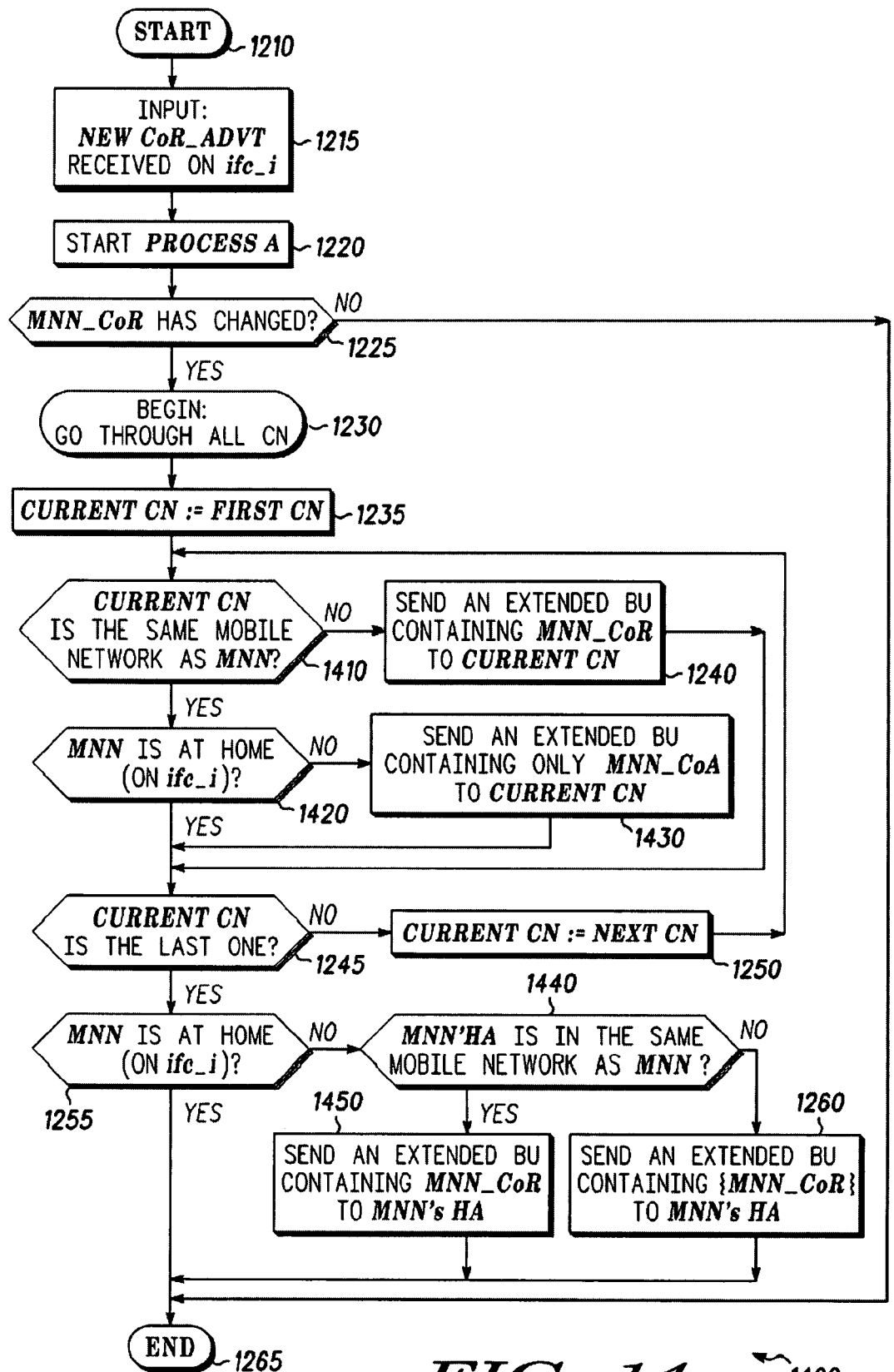
FIG. 14    1400

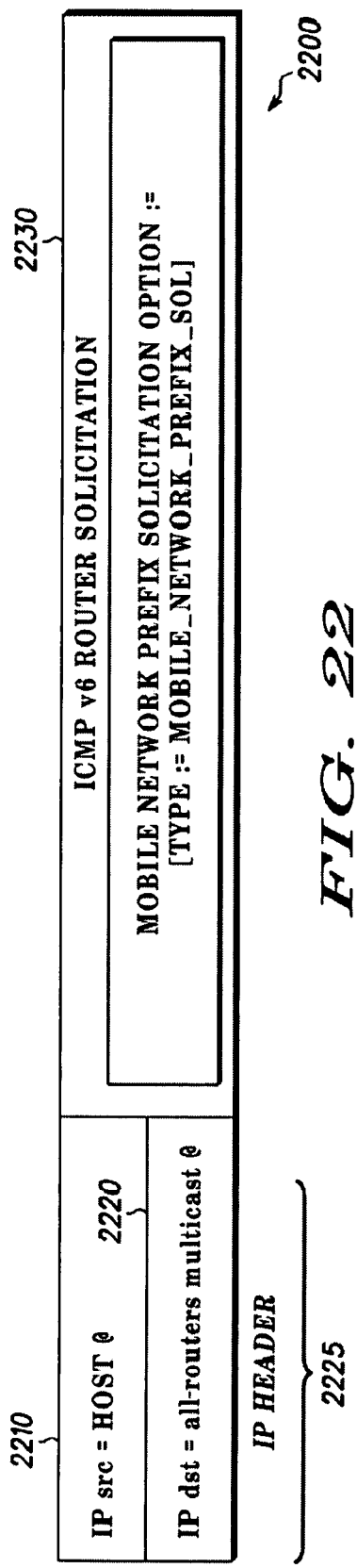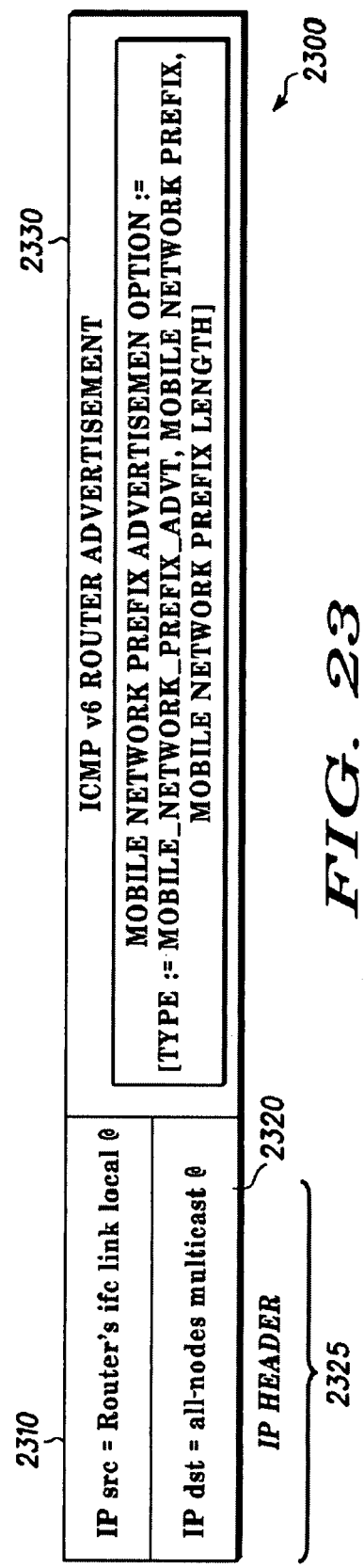
FIG. 22
FIG. 23

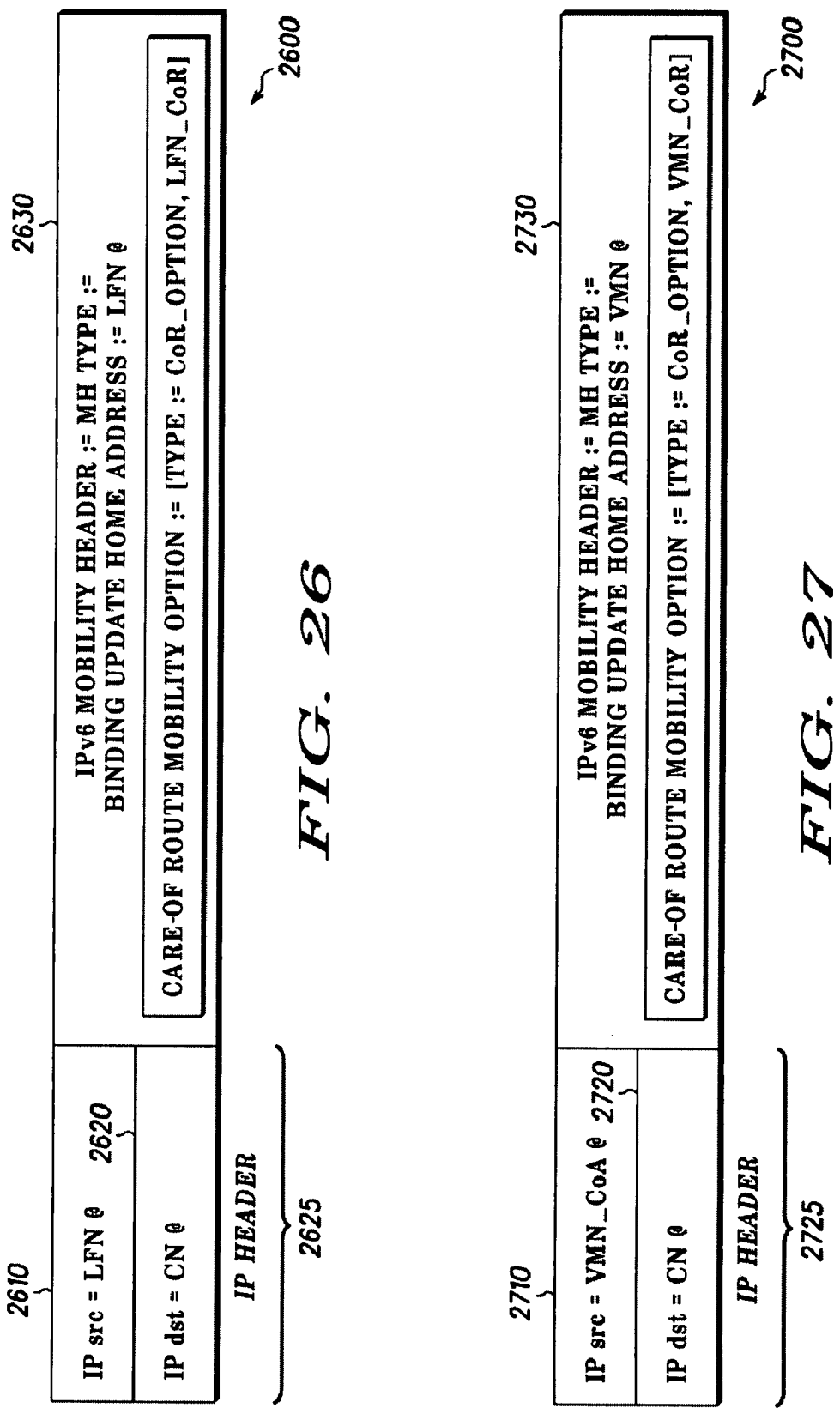

DATA FLOW BETWEEN A COMMUNICATION NODE AND A MOBILE NODE IN A MOBILE NETWORK

REFERENCE TO RELATED APPLICATION

The present application claims priority from PCT Application No. PCT/EP03/06209, entitled "DATA FLOW BETWEEN A COMMUNICATION NODE AND A MOBILE NODE IN A MOBILE NETWORK" filed Jun. 11, 2003, which is commonly owned and incorporated herein by reference in its entirety, and which claims priority to EPC Application No. 02291523.5 filed Jun. 19, 2002.

FIELD OF THE INVENTION

This invention relates to telecommunication systems in which data flows between mobile nodes, for example personal digital assistants with wireless communication capability, and a data network, for example the Internet.

BACKGROUND OF THE INVENTION

The Internet is becoming more and more popular, and users increasingly wish to access the Internet whilst on the move. Different types of mobile nodes (i.e. mobile communication units) may be employed for this purpose, for example a mobile telephone or a personal digital assistant (PDA) with wireless communication capability.

Increasingly, mobile users are accessing the Internet via different types of fixed or wireless access networks, for example a cellular radio communication network, such as a Universal Mobile Telecommunication System (UMTS) network, a HiperLAN/2 or IEEE 802.11b local area network, a Bluetooth local communication system, or fixed accesses such as the Ethernet, and so on. The data route between the mobile node and the Internet further comprises an Internet protocol subnet (IP subnet), such that the route is as follows: mobile node-access network-IP subnet-Internet (and reverse order for the data route from the Internet to the mobile node).

It is currently possible to seamlessly handover accessing of the Internet from one access network to another, for example by using a protocol known as Mobile-IP.

Traditional mobility support aims to provide continuous Internet connectivity to mobile hosts, thereby allowing individual mobile users to connect to the Internet whilst being mobile and moving their Internet access location. In contrast, network mobility support is concerned with situations where an entire network changes its point of attachment to the Internet topology and thus its accessibility in the topology. Such a network in movement can be called a Mobile Network.

There exist a large number of scenarios where such Mobile Networks exist. For example, a Personal Area Network (PAN, i.e. a network of several personal devices attached to an individual) is known whereby the PAN changes its point of attachment to the Internet topology whilst the user is walking in a shopping mall. In addition, a network may be embedded in a bus or aircraft, providing on-board Internet access to passengers. A passenger may use a single communication device (e.g. a laptop) or be itself a Mobile Network (e.g. a PAN). Notably, this configuration illustrates a case of a Mobile Network visiting a Mobile Network (i.e. nested mobility).

As such, a Mobile Network can be defined as a set of nodes composed of one or more IP-subnets attached to a Mobile Router (MR). These IP subnets may also be viewed as a mobile unit, with respect to the rest of the Internet, i.e. a MR and all its attached nodes (so called Mobile Network Nodes or MNNs).

A document [1] authored by Thierry Ernst, Hong-Yon Lach, IETF Internet-Draft draft-ernst-monet-terminology-00.txt, February 2002, describes a list of definitions for the Mobile Network terminology that can be applied in this application. In particular, the following terms may be defined as follows:

(i) A Local Fixed Node (LFN):

A node permanently located within the Mobile Network and that does not change its point of attachment. A LFN can either be a Local Fixed Host (LFH) or a Local Fixed Router (LFR).

(ii) A Local Mobile Node (LMN):

A local mobile node is one that belongs to the Mobile Network and changes its point of attachment from a link within the Mobile Network to another link within or outside the Mobile Network. In this regard, it can be assumed that the home link of the LMN is a link within the Mobile Network. A LMN can either be a Local Mobile Host (LMH) or a Local Mobile Router (LMR).

(iii) A Visiting Mobile Node (VMN):

A VMN is one that does not belong to the Mobile Network, and changes its point of attachment from a link outside the Mobile Network to a link within the Mobile Network (i.e. the home link of the VMN is not a link within the Mobile Network). A VMN that attaches to a link within the Mobile Network obtains an address on that link. A VMN can either be a Visiting Mobile Host (VMH) or a Visiting Mobile Router (VMR).

(iv) A Mobile Network Prefix:

A bit string that consists of a number of initial bits of an IP address, which identifies a Mobile Network within the Internet topology. Nodes belonging to the Mobile Network (i.e. at least MR, LFNs and LMNs) share the same IPv6 "network identifier". For a single mobile IP-subnet, the Mobile Network Prefix is the "network identifier" of this subnet.

(v) An Egress Interface of a MR:

This is the interface attached to the home link if the Mobile Network is at home. Alternatively, it is the interface attached to a foreign link if the Mobile Network is in a foreign network.

(vi) An Ingress Interface of a MR:

This is the interface attached to a link inside the Mobile Network. The concept of egress and ingress interfaces can be extended to other types of nodes within a mobile network as follows:

(a) All network interfaces of hosts (fixed or mobile) in a mobile network are said to be egress interfaces. None of them is said to be an ingress interface.

(b) A fixed router in a mobile network (i.e. LFR) may have several egress and ingress interfaces. The type of each interface should be pre-configured on such routers. An egress interface is usually an interface on the shortest path to a Mobile Router. A fixed router in a mobile network should have at least one egress interface.

(vii) A MR may have multiple Egress and Ingress interfaces.

(viii) A mobile network may have multiple MRs.

Recently, there has been a lot of interest and research into the Mobile IPv6 specification, as described in the document [2] authored by David B. Johnson: IETF Internet-Draft draft-ietf-mobileip-ipv6-15.txt, July 2001. A major concern with Mobile Ipv6 is that the research has proven that the IPv6 standard is currently unable to adequately address network mobility. In particular, the document [3] authored by Thierry Ernst and Hong-Yon Lach: IETF Internet-Draft draft-ernst-mobileip-v6-network-02.txt, June 2001, details problems encountered with Mobile-IPv6 in supporting Mobile Networks.

In summary, it has been determined that even if a MR's Home Agent (HA) is able to intercept packets addressed to MNNs that are operating behind the MR, the MR's HA is clearly unable to encapsulate them to the care-of-address of the appropriate MR. Note that every data packet has a source address and a destination address. A tunnelled packet is a packet that encapsulates in it another packet. Thus, the encapsulating packet has a pair of source and destination addresses. A further encapsulated packet has additional source and destination addresses.

The lack of knowledge of a true location of a particular MNN results from the HA not knowing any (never mind a preferred) data route to the Mobile Network, once it has moved to a 'visited' location. Unfortunately, when a MR registers with its HA the MR only informs the HA to record a host-specific route in its routing table. The inventors of the present invention have recognised that a preferred network route generated using the mobile network address (prefix, prefix length and care-of-address) of the appropriate MR would greatly assist in this matter.

In the field of this invention, the Mobile IPv4 specification, detailed in [4] C. Perkins, IETF RFC 3220, "IP Mobility Support for IPv4", Standards Track, January 2002, describes how Network Mobility can be supported in the case of IPv4 mobility. However, it has also been determined that IPv4 does not support route optimisation for MNNs behind the MR.

Thus, all the (incoming and outgoing) traffic between a MNN and its corresponding nodes (CNs) is passed to the MR's Home Agent. This problem is exacerbated in the case of nested mobility, which is where a CN wishes to pass data to a MNN that is behind a number of MR links, or a mobile node visiting a mobile network. In the case of nested mobility, the packet will thus be encapsulated several times as a result of being routed through all of the Home Agents of all the nested MRs. This is clearly inefficient routing.

Similarly, in the case of IPv6, the document [5] authored by T. J. Kniveton: IETF Internet-Draft draft-kniveton-mobrtr-00.txt, November 2001 describes how to support mobile networks with no modifications to Mobile IP (v4 or v6). The mechanism proposed to address the support of nested mobility is described with respect to FIG. 2. It suffers from the same problem of multiple tunnelling by the Home Agents of the nested mobile routers as described in the previous paragraph. When a MR, for example MR2 260, has attached to a visited network 110 (via another Mobile Network MR1 link), a bi-directional tunnel 210, 215, 220 is established between MR2 260 and its HA-HA2 250. When a node, for example LFN2 165, is attached to MR2 260 and wishes to send an IP packet to a CN, say CN2 255, via the Internet 115, that packet is tunnelled by MR2 260 (to HA2 250) and again by MR1 150 (to HA1 240). The multiple-tunnelled data packet is then passed to the HA of the latest MR to tunnel the data, namely to HA1 240. HA1 240 then forwards it to the intended recipient CN2 255 via the source MR's HA, namely HA2 250.

This proposed data routing method, and the problems associated with it, are best described by way of an example. Thus, let us assume that LFN2 165 sends a data packet to CN2 255. The data packet is first routed 205 towards MR2 260. The data packet is then tunnelled by MR2 260 to be sent to HA2 250. This tunnelling process of the data packet from MR2 260 to HA2 250 is itself, by necessity, first routed 210 towards its linked MR, namely MR1 150. MR1 150 further tunnels the data and forwards 215 the multiple-tunnelled packet to its HA, namely HA1 240. HA1 240 de-tunnels the data packet, as tunnelled by MR1 150 and forwards 220 the partially de-tunnelled packet to its original intended recipient, HA2 250. HA2 250 further de-tunnels the packet, as tunnelled by MR2 260, and forwards 225 the wholly de-tunnelled data packet to CN2 255.

Clearly, the solution proposed does not provide any support for route optimisation, since both inbound and outbound packets are routed through the Home Agent of both MRs 150, 260. In fact, packets from CN2 255 addressed to LFN2 165 will follow the same path (in reverse order) and will then be encapsulated by each Home Agent 240, 250 of each of the nested MRs 150, 260. Once again, this is clearly inefficient routing, particularly for a practical situation whereby there may be many more than two levels in the nested network.

The solution presented in a document authored by Thierry Ernst and Hong-Yon Lach: IETF Internet-Draft draft-ernst-mobileip-v6-network-02.txt, June 2001, proposes a means for supporting network mobility in the framework of Mobile IPv6. This solution introduces the following concept: when a Mobile Router roams to a visited network, it sends a Prefix Scope Binding Update to its Home Agent (HA). Unlike a classical Mobile IPv6 Binding Update message, a Prefix Scope Binding Update does not bind a home address with a care-of address.

In contrast, the MR Prefix is bound with the MR care-of address, for a particular MR. Upon reception of a packet whose prefix matches with the MR prefix, the Home Agent must then tunnel the packet to the MR care-of-address that has been identified as being able to deliver the tunnelled packet to the intended recipient. Likewise, a MR may send prefix-scope BUs to the corresponding nodes of the nodes it serves. This solution brings a more efficient support of mobile networks to Mobile IPv6, since it may provide a limited improvement to route optimisation.

However, the scope of this draft has explicitly excluded the case of nested mobility, which presents a significant hurdle to efficient route optimisation. As such, the solution proposed in the Thierry Ernst document, IETF Internet-Draft draft-ernst-mobileip-v6-network-02.txt, June 2001, fails to provide a useful solution to route optimisation in many practical situations. Again, the problems that emanate from this document, particularly in the case of nested mobility, are best highlighted in an example situation.

Referring now to FIG. 3, a mechanism for routing data packets in an IPv6 network using the proposal of Thierry Ernst: IETF Internet-Draft draft-ernst-mobileip-v6-network-02.txt, June 2001. Notably, the problems emanating from using this mechanism in a nested mobility are highlighted.

A mobile router MR1 150 is attached to a visited link 110. A mobile router MR2 260 is attached to MR1's link 155. A local fixed node LFN2 165 is attached to MR2's link 230. Again, let us assume that LFN2 165 is attempting to communicate with a corresponding node CN2 255.

Let us further assume that, at the beginning of the simple scenario detailed in FIG. 3, MR1 150 and MR2 260 have already sent BU messages to their respective HAs 240, 250. That is, HA1 240 knows that MR1's 150 prefix is reachable at MR1's care-of address. Similarly, HA2 250 knows that MR2's 260 prefix is reachable at MR2's care-of-address.

When a data packet is sent from CN2 255 to LFN2 165, CN2 255 has no knowledge about LFN2's 165 actual location. Thus, the data packet that it sends is therefore routed 325 towards home link-2 105. HA2 250 intercepts the data packet and tunnels it to MR2's care-of address. This can be understood, as HA2 250 knows that MR2's prefix is reachable at MR2's care-of address.

This tunnelled packet (from HA2 250 to MR2's 260 care-of address) is routed 320 toward link-1 245, since MR2's 260 care-of address matches MR1's 150 prefix. HA1 240 intercepts the data packet and tunnels it to MR1's care-of address, namely towards the visited link 110, since HA1 240 knows that MR1's prefix is reachable at MR1's care-of address.

MR1 150 then de-tunnels the data packet received from HA1 240. MR1 150 then forwards the content to the original recipient, MR2 260. Meanwhile, MR1 150 sends a Binding Update to the sender of the encapsulated packet (that is HA2 250) to inform it that MR1's prefix is reachable at MR1's care-of address. Note that from MR1's point of view, HA2 250 is a Correspondent Node and not its Home Agent (i.e. the 'H' bit in the BU is not set). It is up to the HA2 250 to accept this Binding Update or not.

MR2 260 de-tunnels the data packet that it received (i.e. the portion of the data packet that had been encapsulated by HA2 250) and forwards the content (the initial packet from CN2 255) to LFN2 165. Meanwhile, MR2 260 sends a Binding Update message to the sender of the encapsulated packet (that is, CN2 255) to inform it that MR2's prefix (covering the LFN2 165 address) is reachable at M2's care-of address. This information is stored in the CN's binding cache 370.

Once an initial packet has reached its destination, transmission of a second or subsequent packet from CN2 255 to LFN2 165 leads to the scenario depicted in FIG. 4. After having reviewed its binding cache 370, CN2 255 recognises that LFN2 165 is reachable at MR2's care-of address.

Thus, it sends the data packet to MR2's care-of-address with a routing header for LFN2 165. MR2's care-of-address belongs to MR1's link and is therefore routed towards Home Link-1 245. In this manner, a minor improvement to route optimisation is achieved by the bypassing of the transmission of the data packet to, and from, HA2 250.

HA1 240 then intercepts the data packet and tunnels the packet to MR1's care-of address, since HA1 240 knows that MR1's prefix is reachable at MR1's care-of address.

MR1 150 de-tunnels the packet from HA1 240 and forwards the content to the mobile router MR2 260 of the originally intended recipient, LFN2 165. Meanwhile, MR1 150 sends a Binding Update to the sender of the encapsulated packet (that is, CN2 255) to inform it that MR1's prefix is reachable at MR1's care-of address.

When receiving the original packet as sent by CN2 255, MR2 260 replaces its address in the destination field of the packet with the address contained in the routing header (that is, LFN2 165) and forwards the data packet to the ultimate recipient.

The inventors of the present invention have identified a significant problem with the scenario depicted in FIG. 4. All subsequent packets from CN2 255 to LFN2 165 will be routed in exactly the same manner as the second data packet. That is, there will be no subsequent improvement towards route optimisation. This is more clearly shown in respect of FIG. 5.

Referring now to FIG. 5, a known binding cache 500 is illustrated. The binding cache comprises a list of entries, specific to each MR in a nested mobility scenario. The binding cache entries include, for example a MR3 prefix and prefix length 530, with a link 532 to a determined MR3 care-of-address 534, if one has been determined. The MR3 entry 535 is linked 536 to the next entry in the binding cache, namely that for MR2. The MR2 prefix and prefix length 520, includes a link 522 to a determined MR2 care-of-address 524, if one has been determined. A similar arrangement and link 526 is performed to MR1, and so on.

In addition, the binding cache entries include a flag entry (not shown). A 'P' flag is the "Prefix Scope Registration" flag.

When it is set, a "Home Address" field is filled with the Mobile Network prefix (the prefix that is advertised by the Mobile Router) and the "Prefix Length" corresponds to the length of the Mobile Network prefix.

It is specified in the document by Thierry Ernst: IETF Internet-Draft draft-ernst-mobileip-v6-network-02.txt, June 2001, that the Binding Cache is searched for an entry corresponding to the destination address of the packet in one pass. As a result of the search, either nothing has been found (no entry), or the full address has been found (128-bit match for an IPv6 address, P flag unset), or the first bits of the destination address match with a registered prefix for the registered prefix length. In the latter case, the destination is located in a mobile network.

Therefore, with reference to FIG. 4, when CN2 255 has to send a packet to LFN2 165, CN2 255 still reviews its binding cache and finds the entry 'MR2 260 prefix reachable at MR2 260 Co@' 520, 524. CN2 255 does not even consider the entry 'MR1 150 prefix reachable at MR1Co@' 510, 514, as this would appear to have no bearing on the LFN2 address. The inventors have recognised that this deficiency results from the LFN2 165 address being unrelated to the MR1 prefix. The fact that MR2 260 Co@ belongs to MR1 prefix is neither seen, nor even used by CN2 255.

Consequently, the only optimisation that the Thierry Ernst proposal can support is related to the HA (HA2 250) of the MR (MR2 260) serving the communicating MNN (LFN2 165 in the above example). This solution describes indeed a means for having packets be sent directly from CN2 255 to HA1 240, instead of CN2 255 to HA2 250 and thereafter to HA1 240. However, if there were n successive levels of nested mobility, this solution provides minimal route optimisation, no more than having a CN2 $255 \rightarrow HA_{n-1} \rightarrow HA_{n-2} \rightarrow \ldots \rightarrow HA1$ path instead of CN2 $255 \rightarrow HA_n \rightarrow HA_{n-1} \rightarrow HA_{n-2} \rightarrow \ldots \rightarrow HA1$ path. This proposal is therefore still clearly inefficient, particularly in the case of nested networks.

A need therefore arises for a mechanism, apparatus and associated methods to support route optimisation in Network mobility, especially in the case of IPv6. In particular, a need has arisen to support route optimisation in the case of nested mobility, wherein the aforementioned problems are substantially alleviated.

Figure 1:
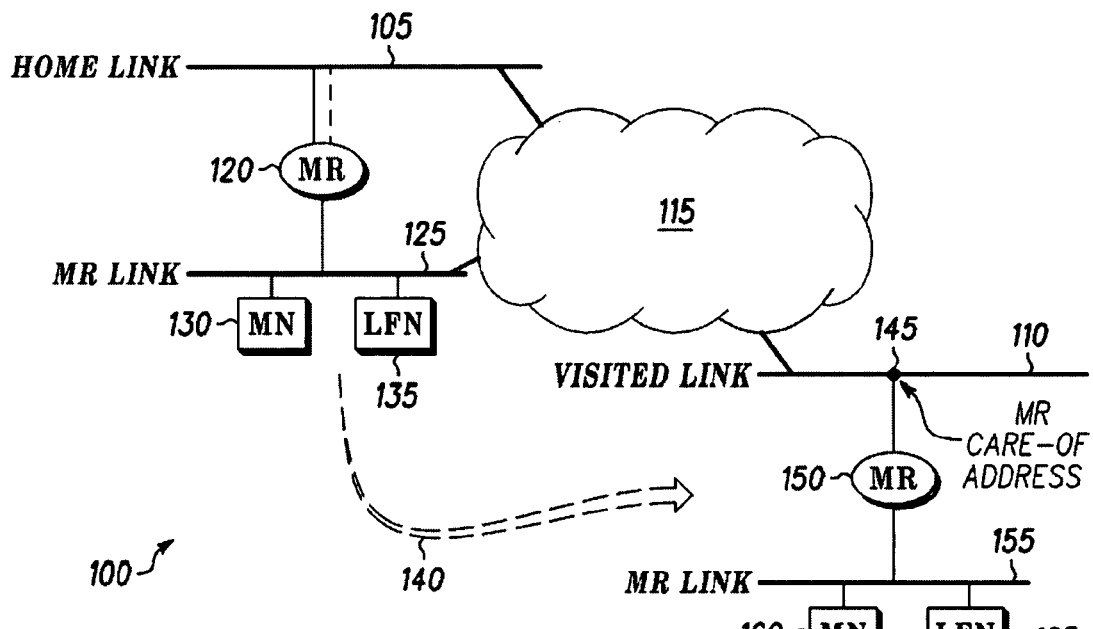
FIG. 1 illustrates the movement of a Mobile Network in an Internet.
Figure 2:
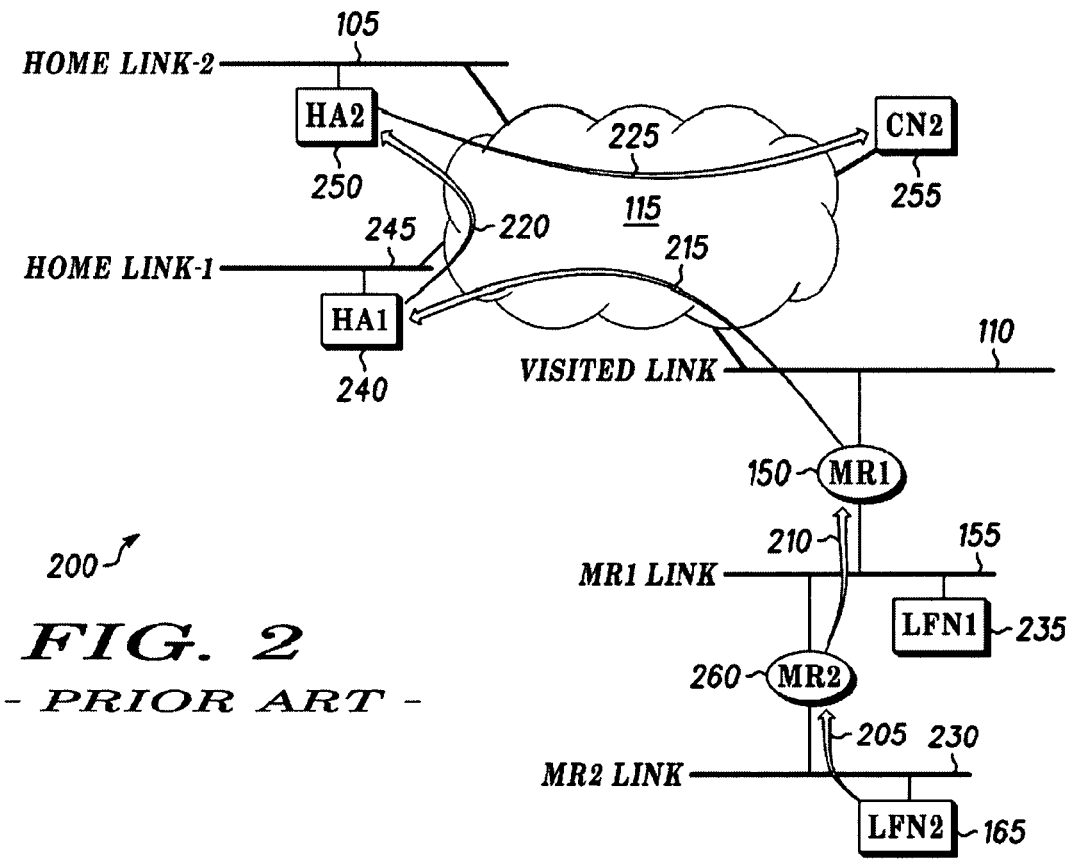
FIG. 2 illustrates a known packet data routing mechanism for mobile networks when applied to nested mobility.
Figure 3:
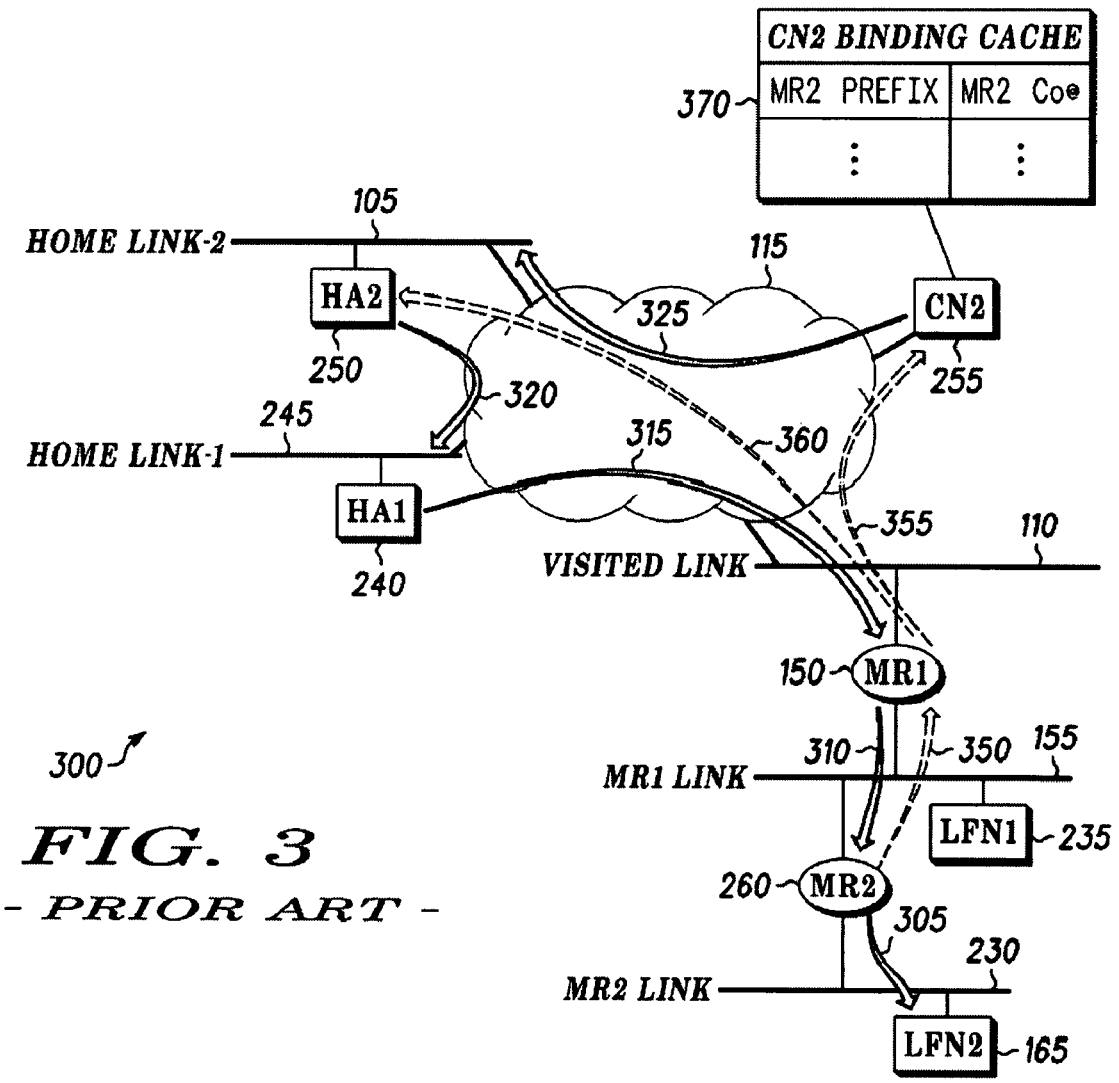
FIG. 3 illustrates a known packet data routing mechanism for mobile networks when applied to nested mobility that highlights the inefficiency of the data routing.
Figure 4:
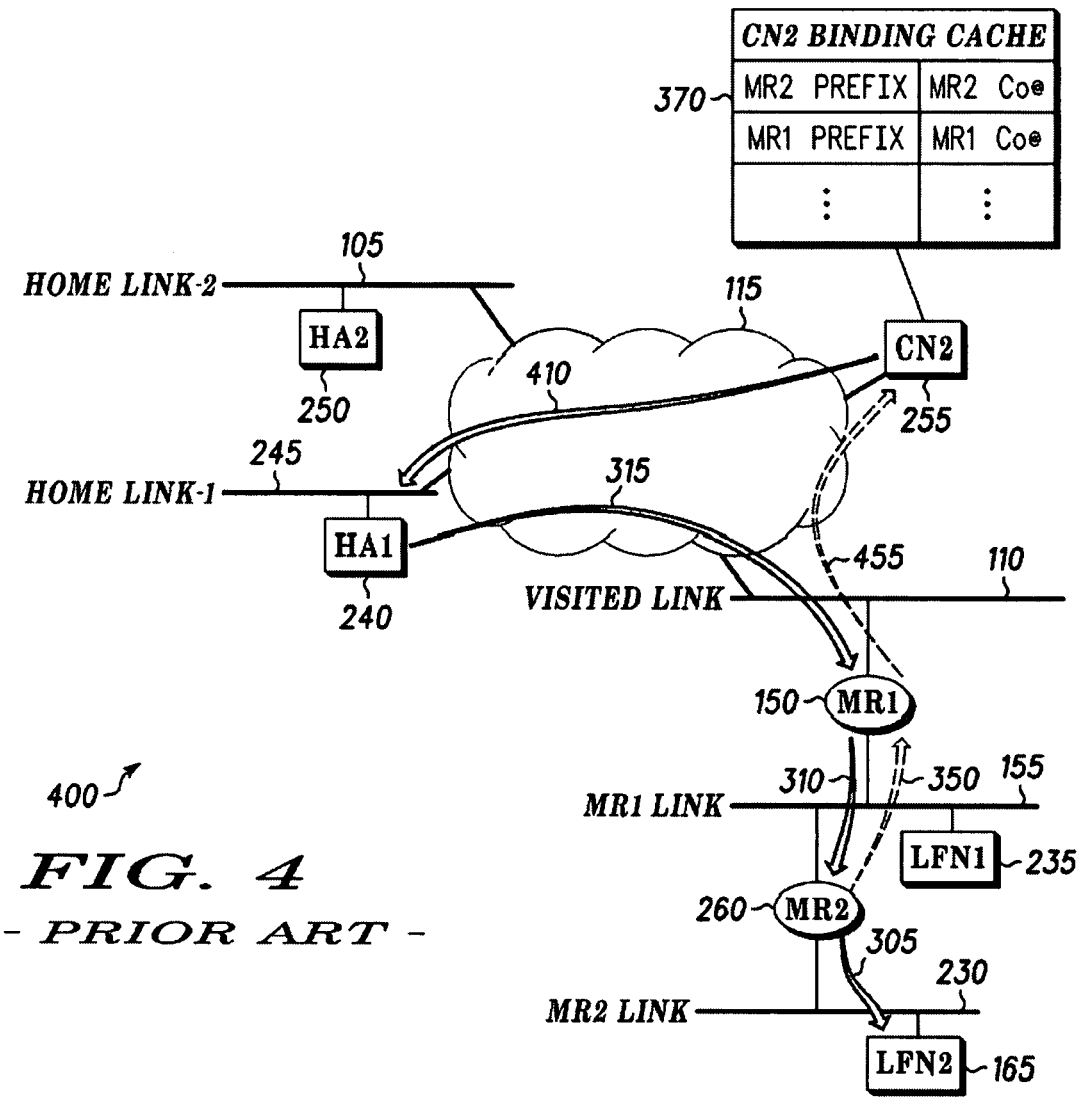
FIG. 4 illustrates a known packet data routing mechanism for mobile networks when applied to nested mobility that highlights the inefficiency of an improved process of the data routing.
Figure 5:
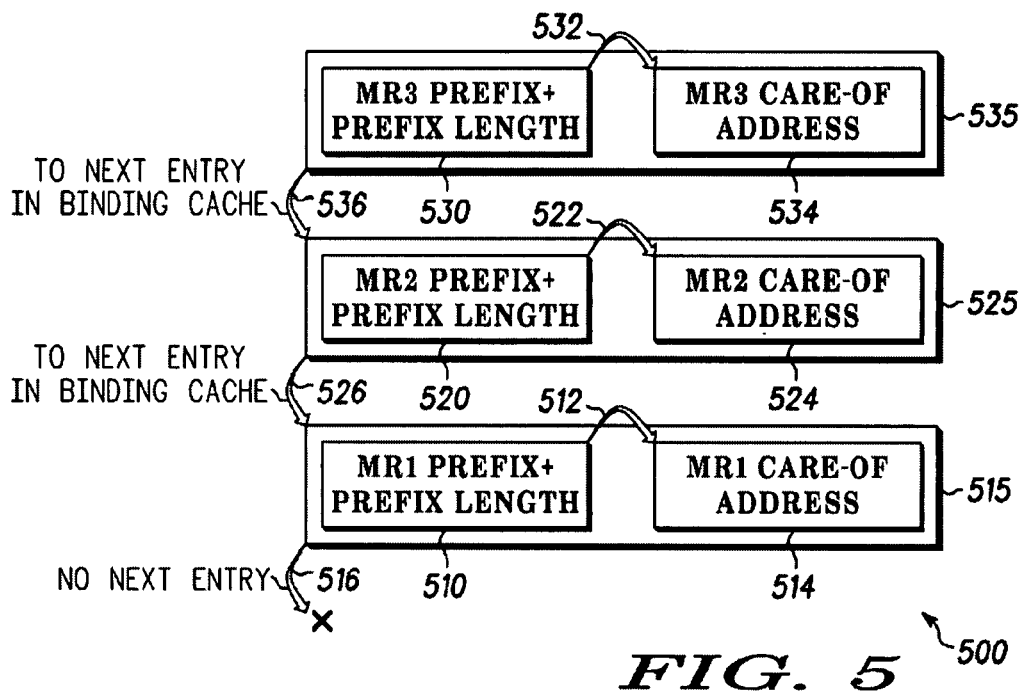
FIG. 5 illustrates a known binding cache for routing data packets in mobile node networks.
Figure 6:
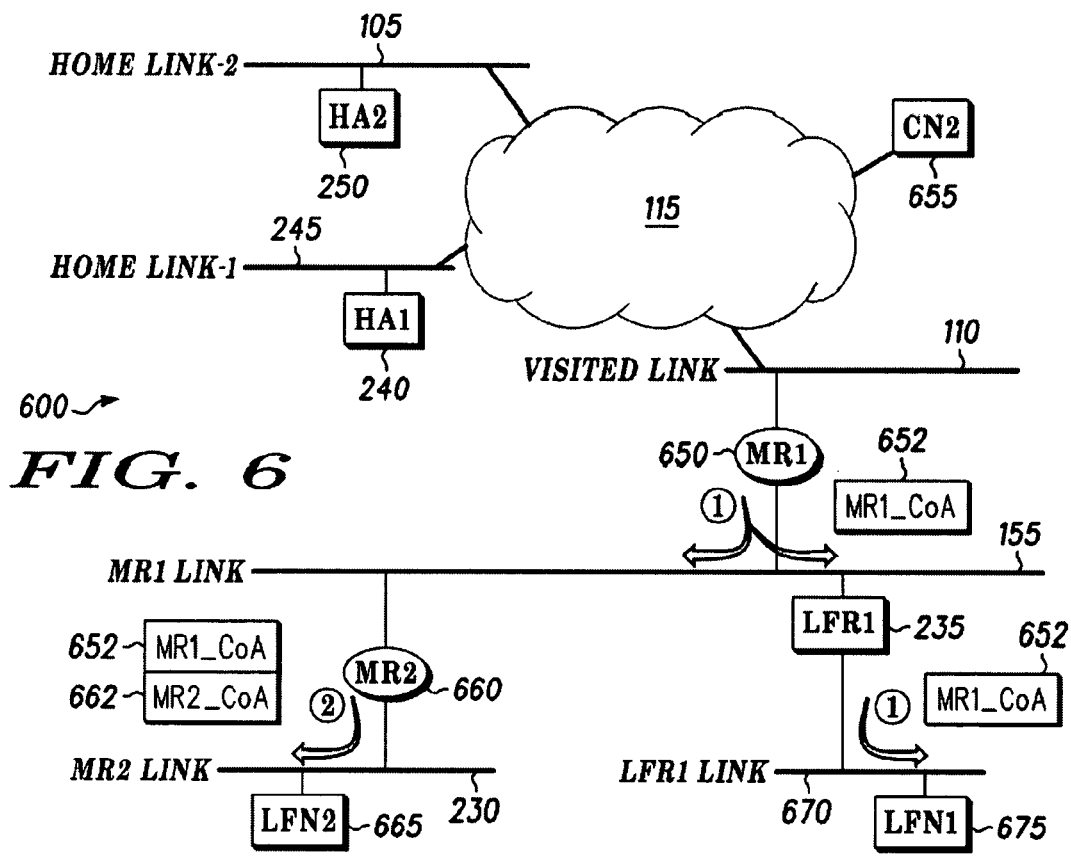
Figures 7, 8, 9:
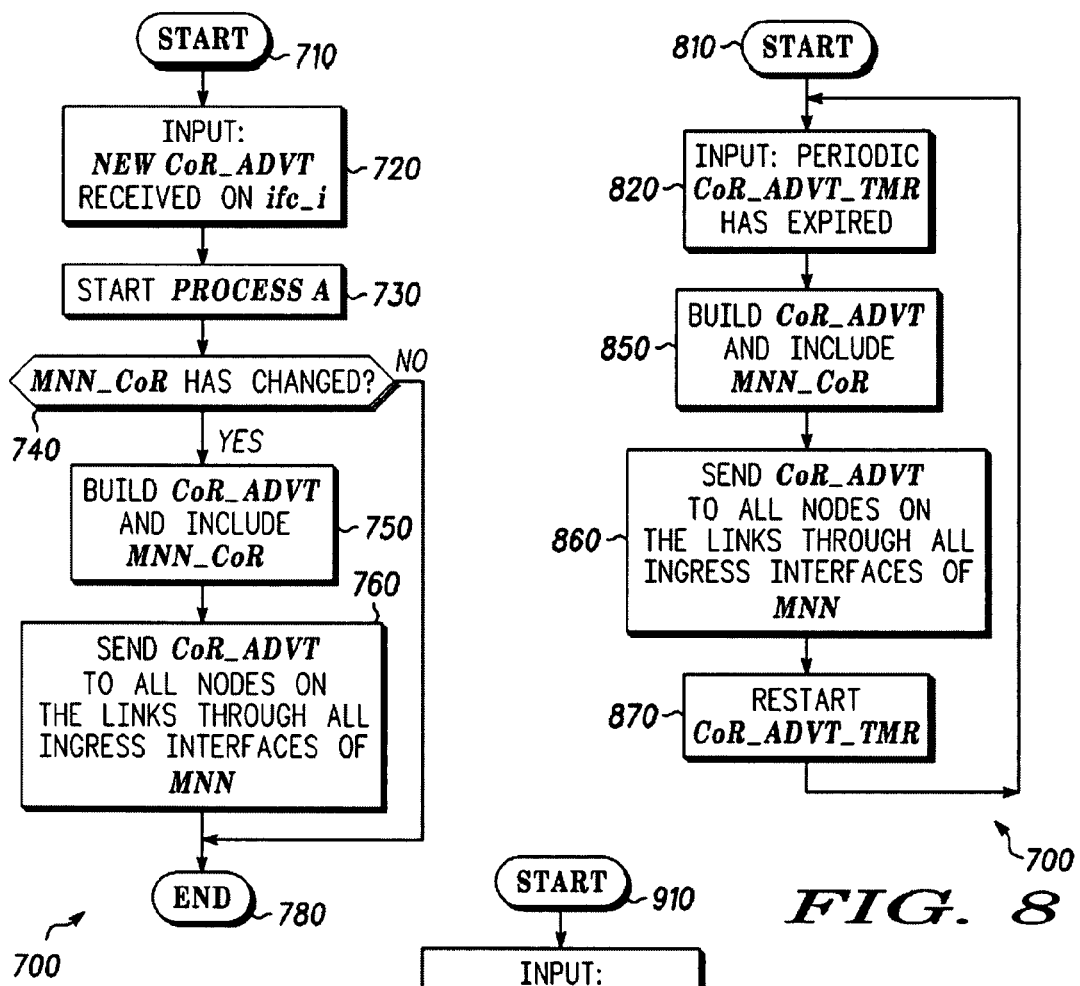
Figure 10:
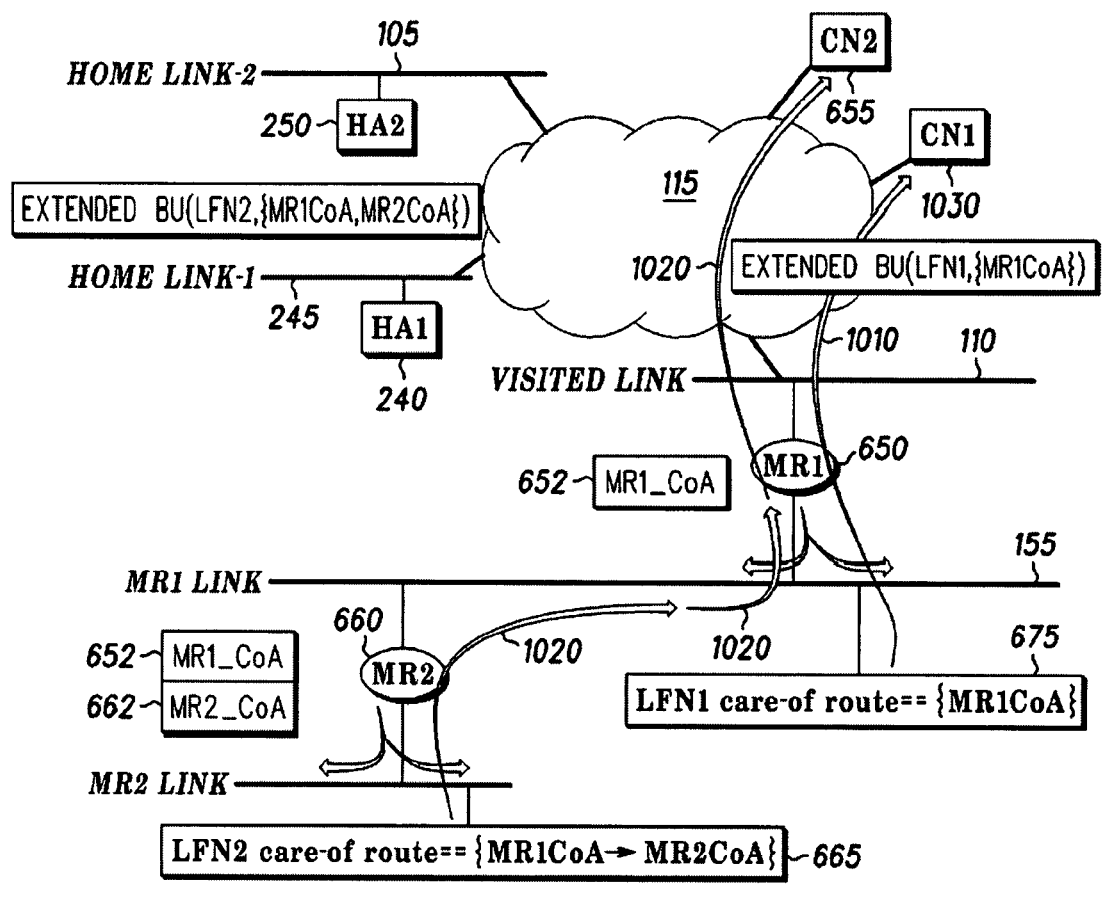
Figure 11:
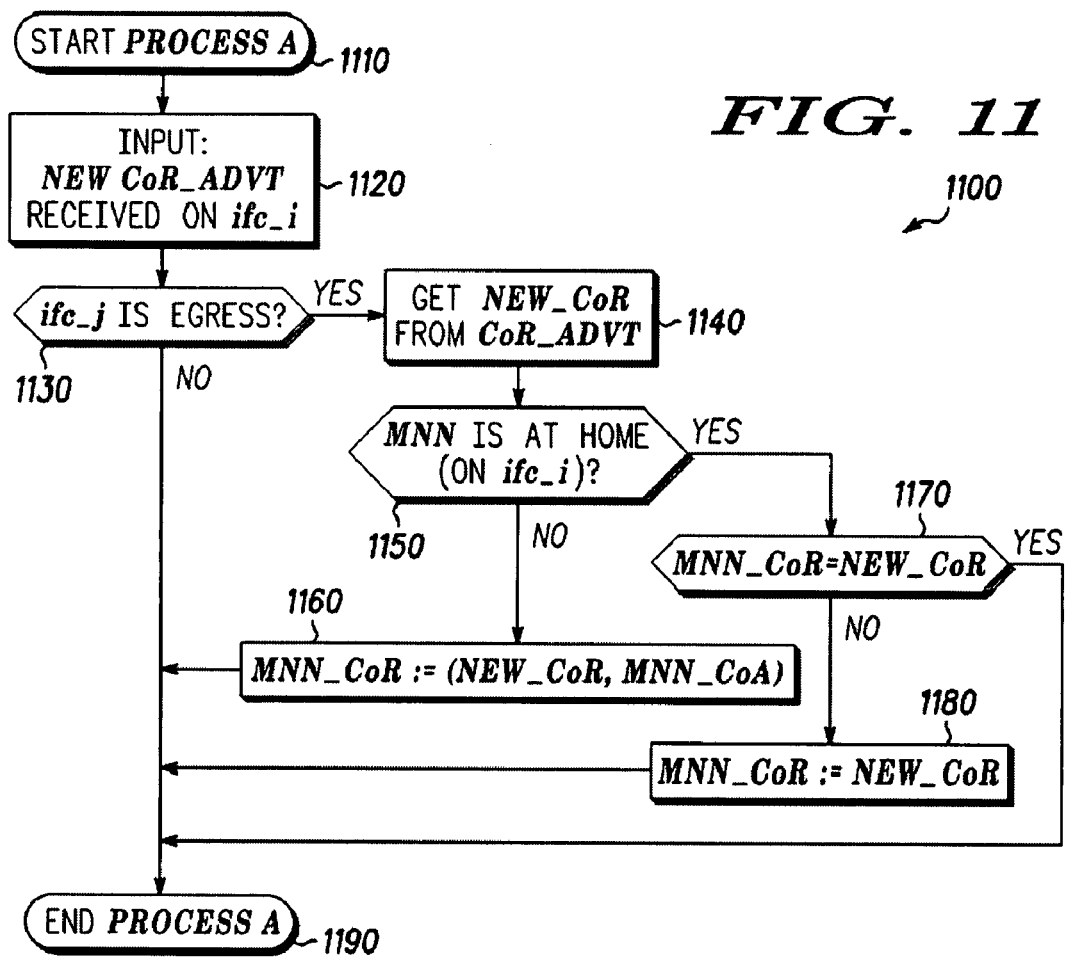
Figure 13:
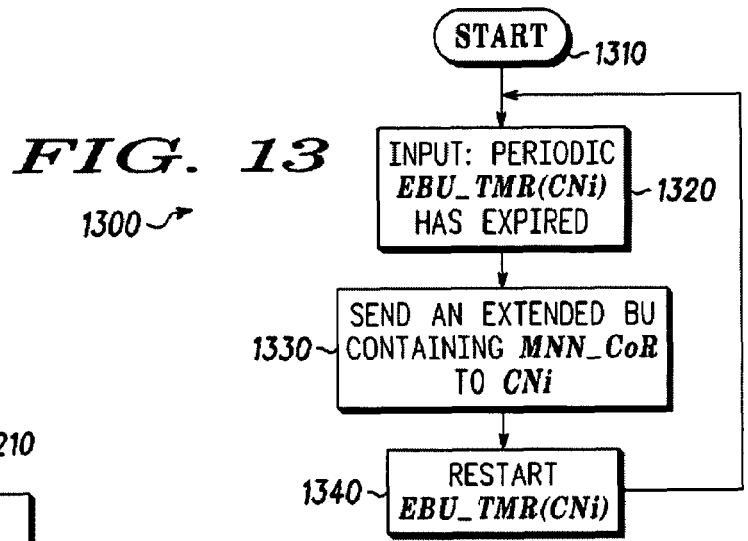
Figure 12:
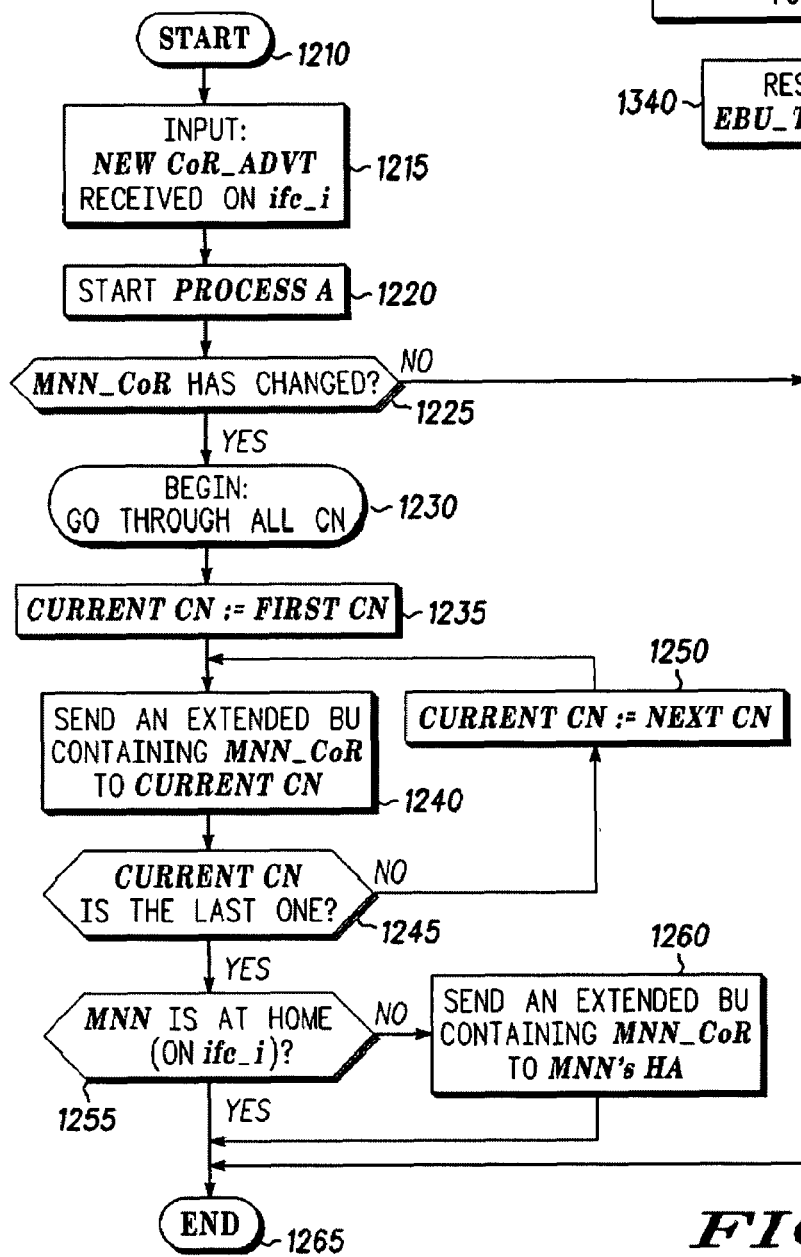
Figure 15:
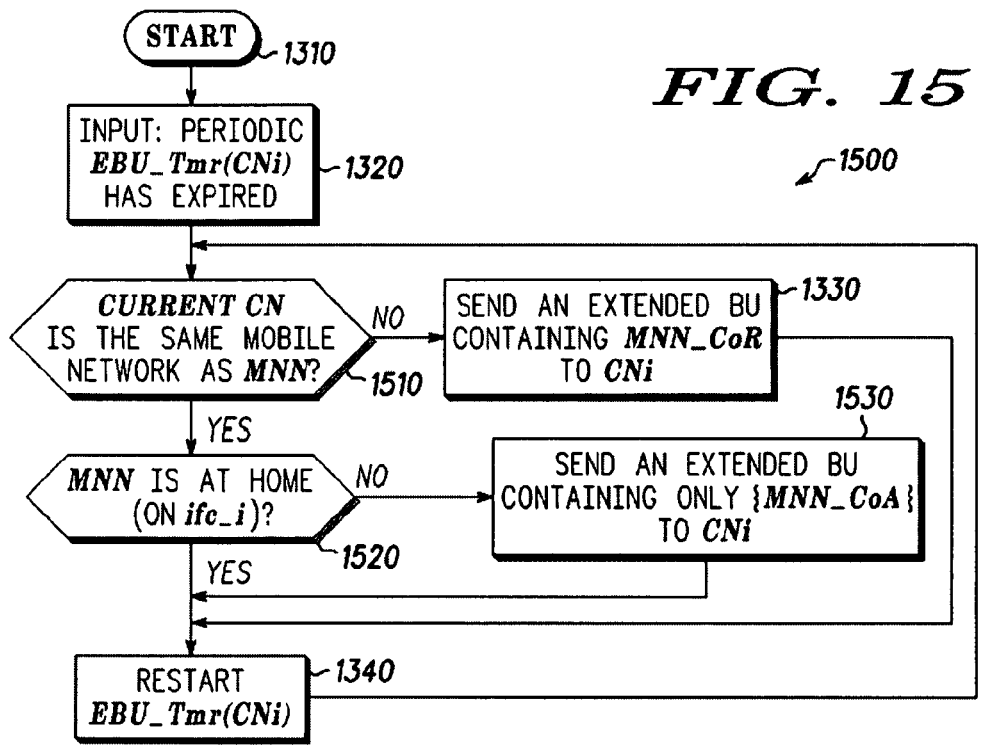
Figure 16:
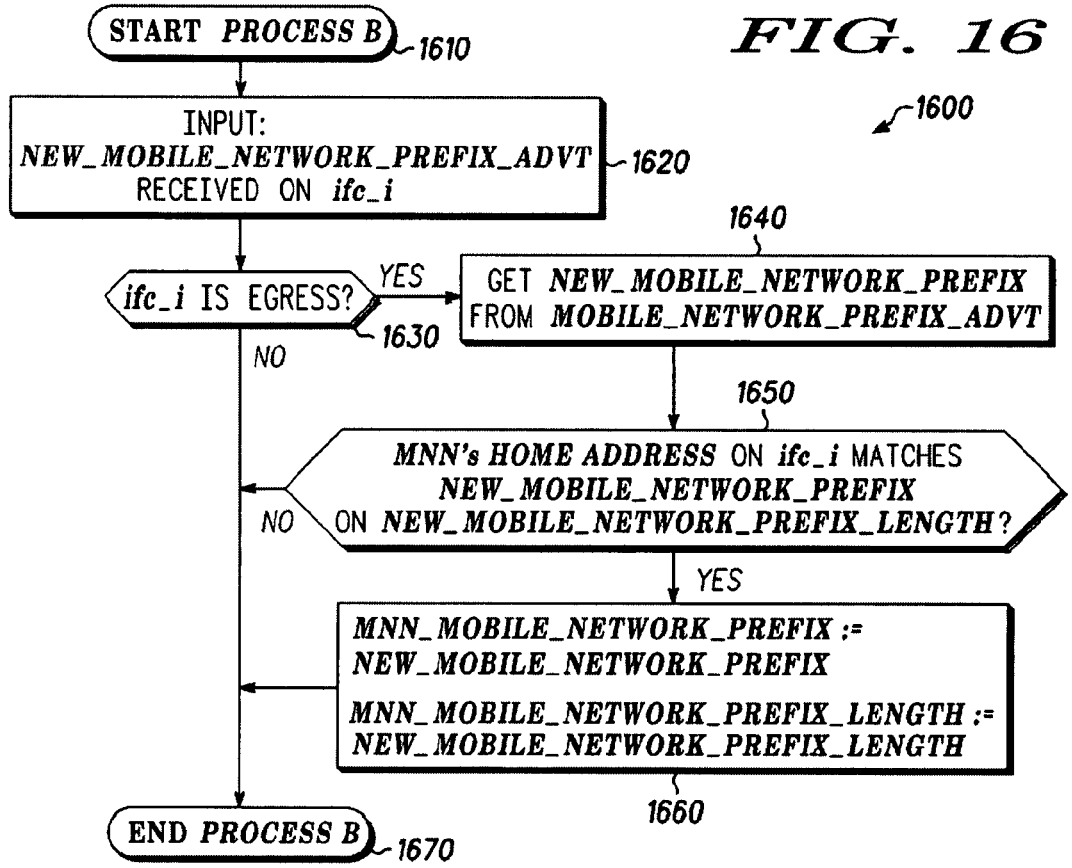
Figure 17:
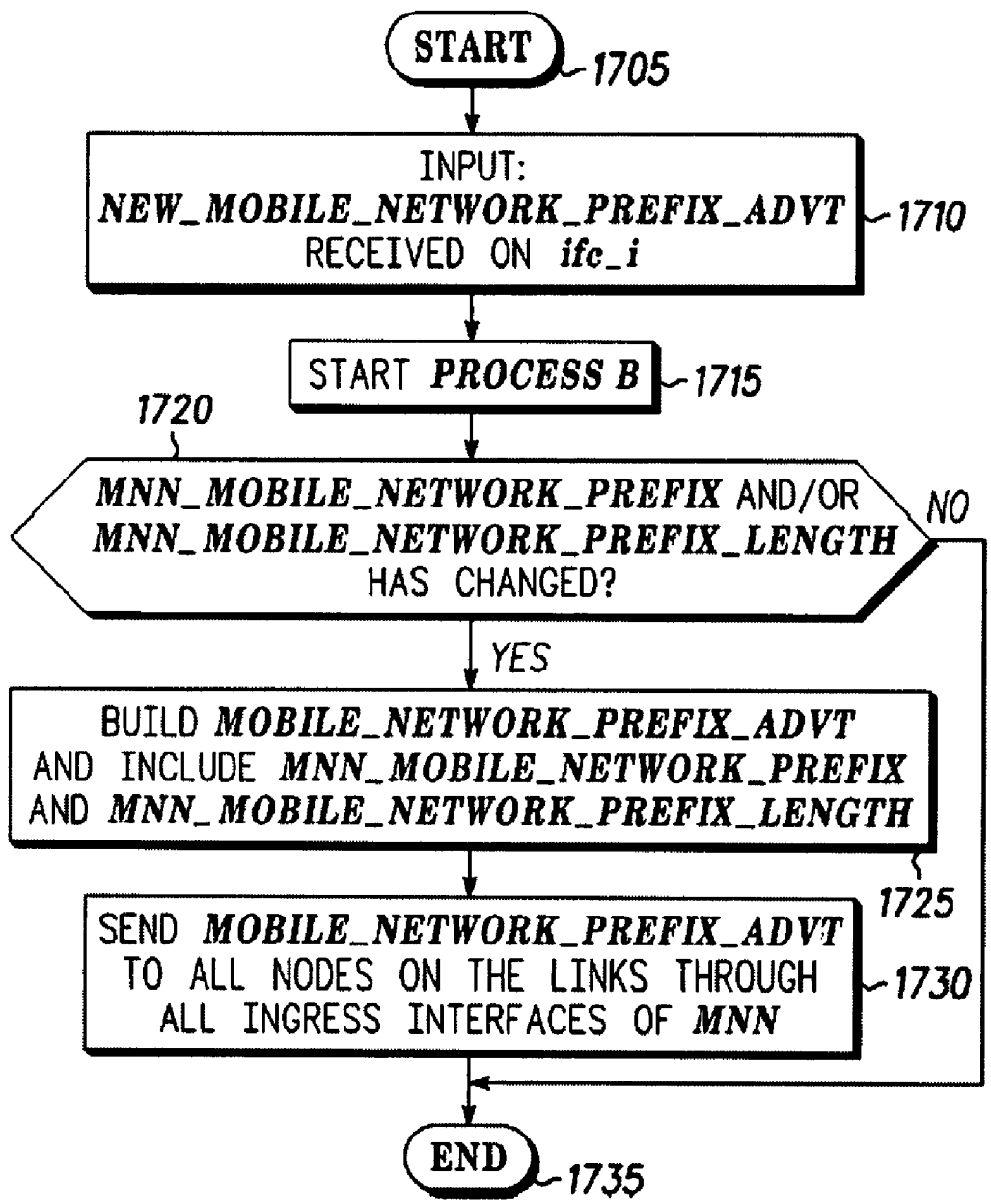
Figure 18:
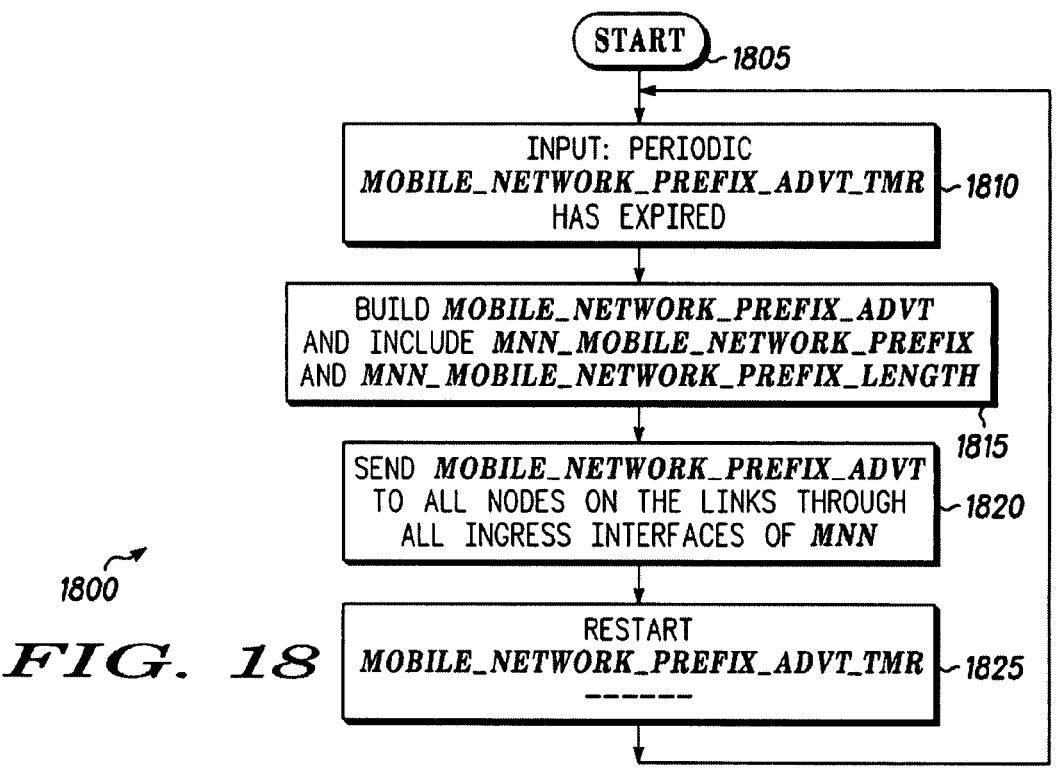
Figure 19:
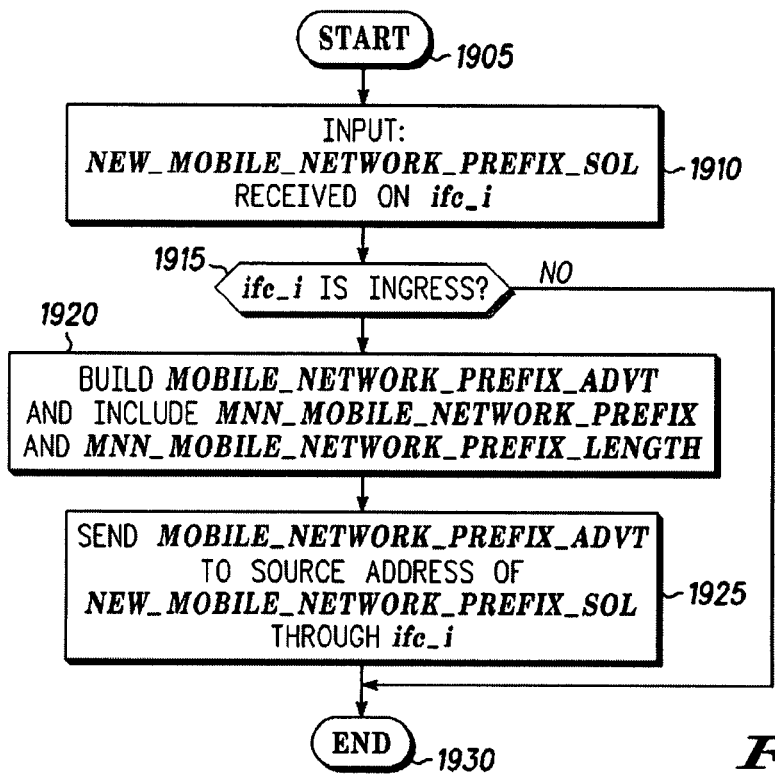
Figure 20:
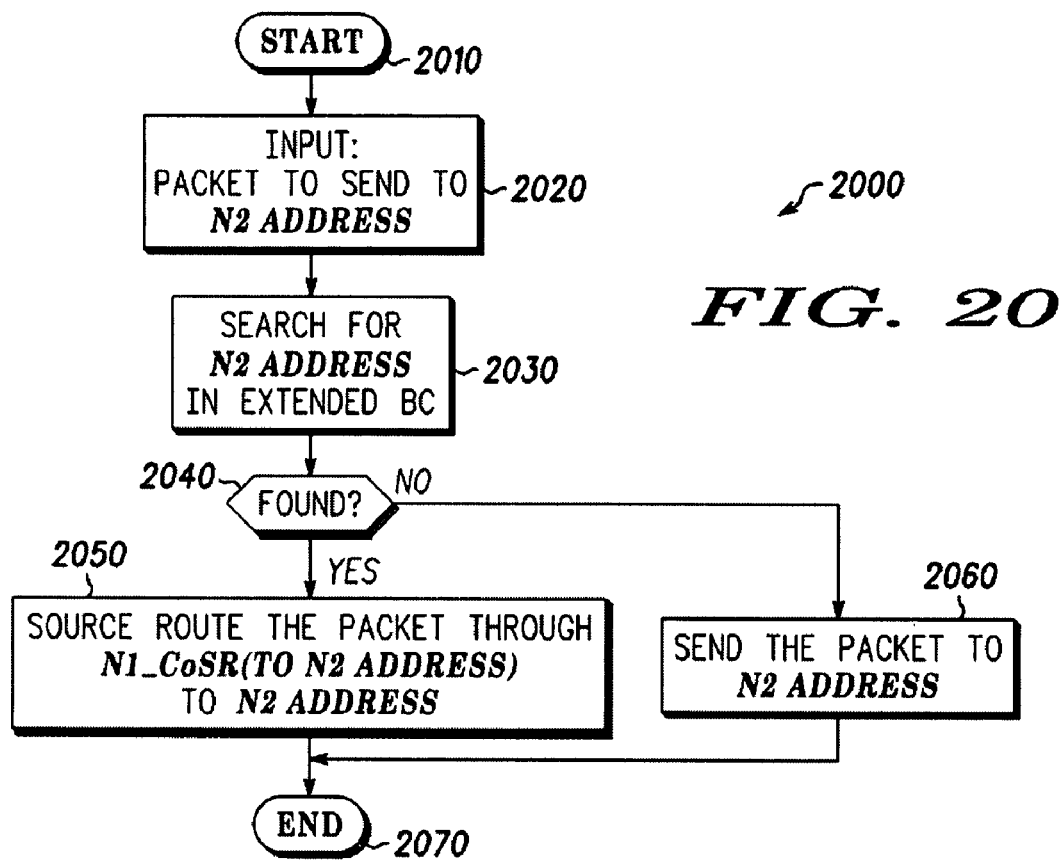
Figure 21:
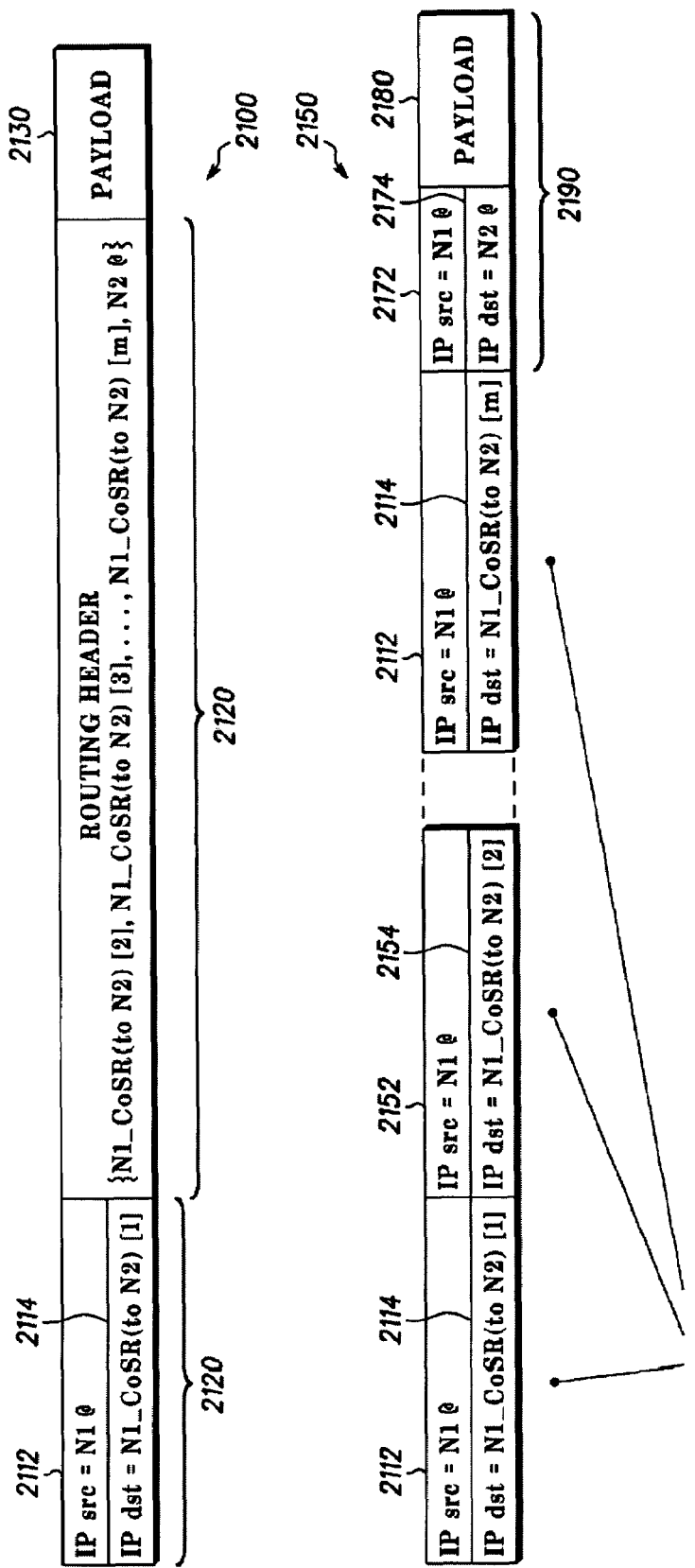
Figure 24:
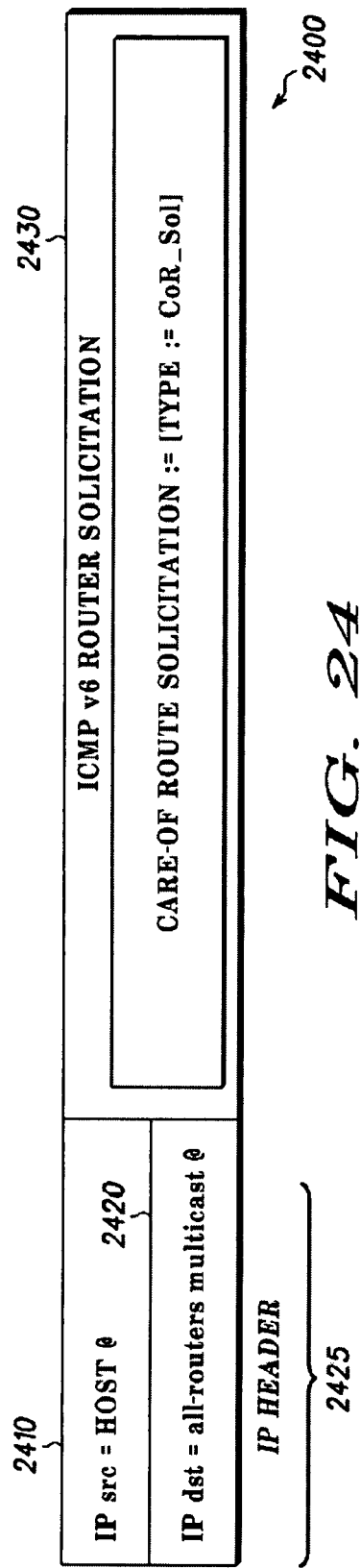
Figure 25:
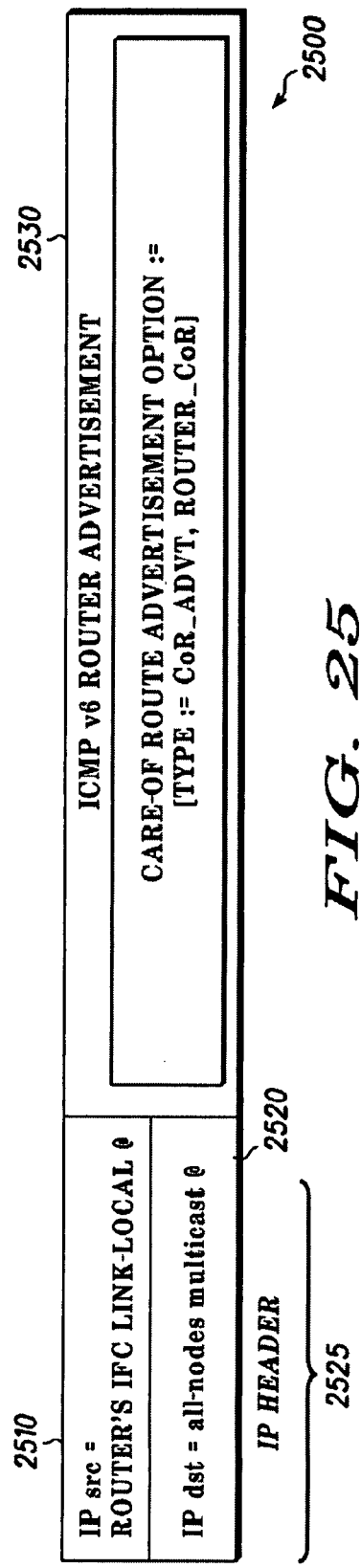
Figure 28:
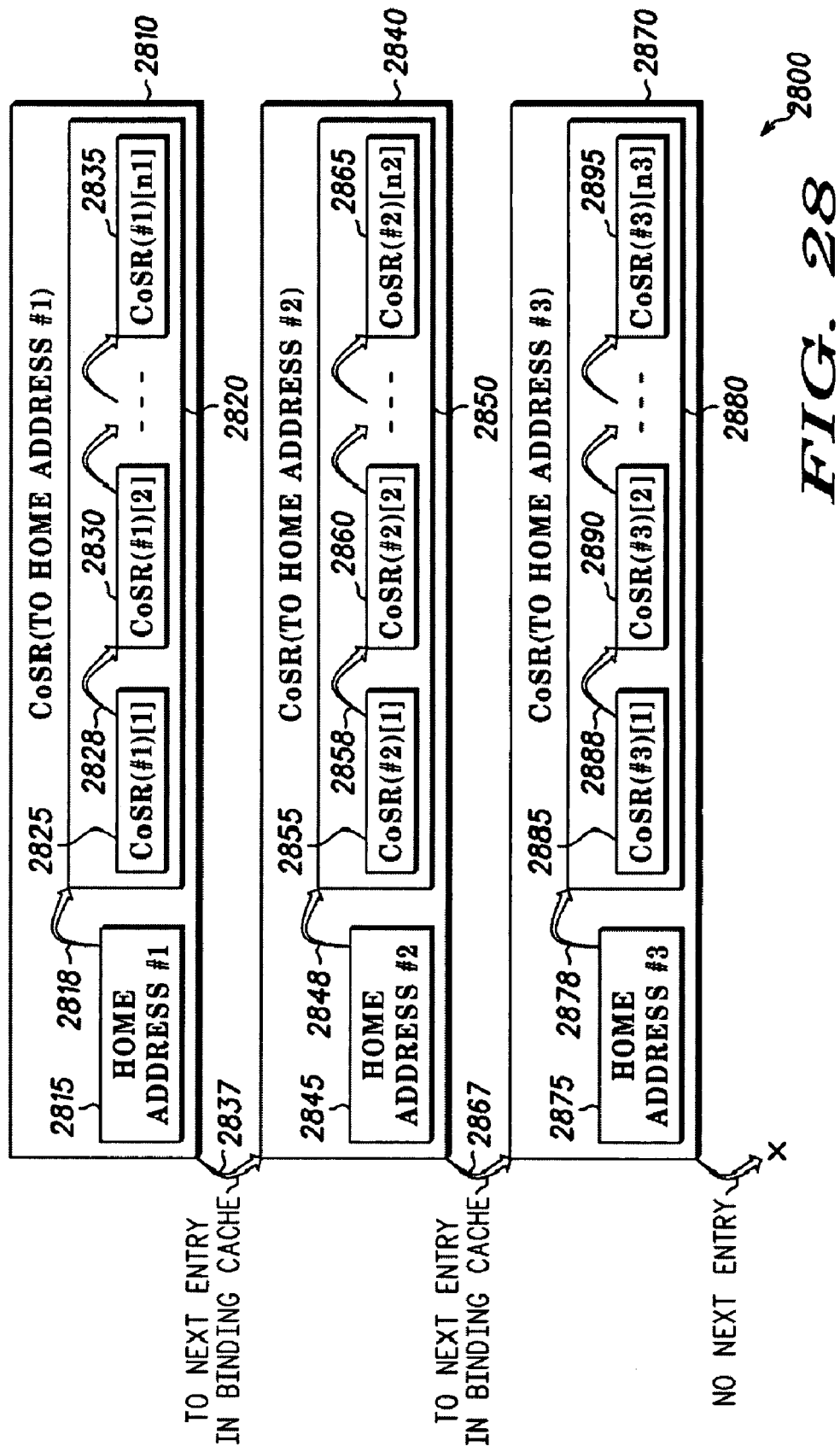
Figure 29:
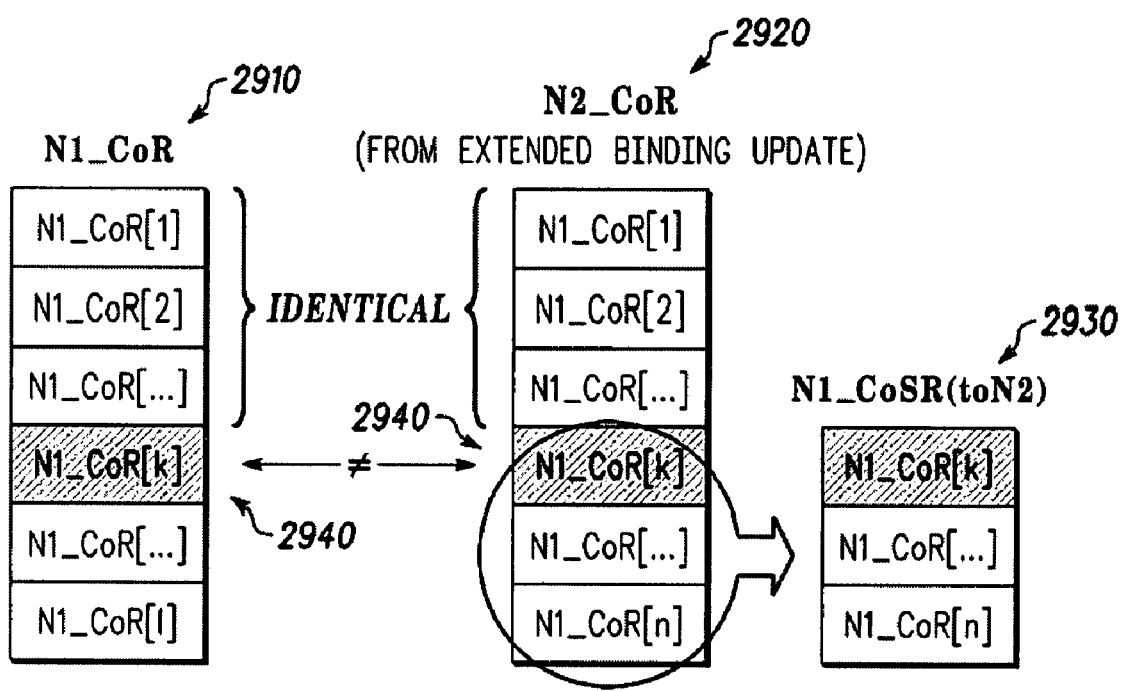
Figure 30:
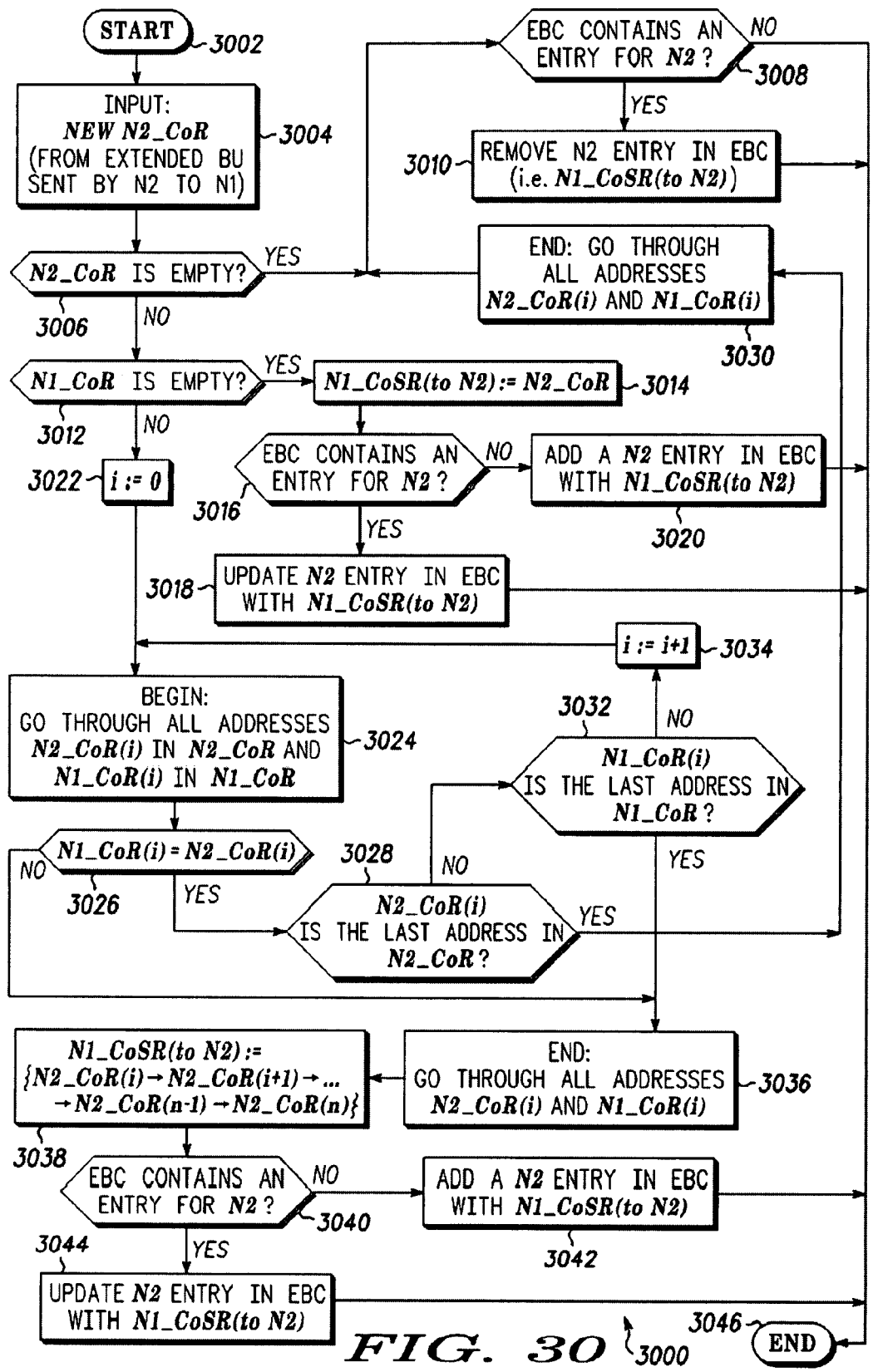

Exemplary embodiments of the present invention will now be described, with reference to the accompanying drawings, in which:

FIG. 6 illustrates a network topology for advertising a mobile router mobility within mobile networks, in accordance with the preferred embodiment of the present invention;

FIG. 7, FIG. 8 and FIG. 9 illustrate flowcharts for an MNN router constructing and sending a care-of route advertisement, in accordance with the preferred embodiment of the present invention;

FIG. 10 illustrates a network topology for sending extended BUs to CNs in accordance with the preferred embodiment of the present invention;

FIG. 11 illustrates a flowchart of an MNN generating a care-of route, in accordance with embodiments of the present invention;

FIG. 12 and FIG. 13 illustrate flowcharts of an MNN sending extended BU messages to its CN(s) (and HAs), in accordance with the preferred embodiment of the present invention;

FIG. 14 and FIG. 15 illustrate flowcharts of a MNN sending an extended BU to its CN(s) (and its HAs) in accordance with the preferred embodiment of the present invention;

FIG. 16 illustrates a flowchart of a dynamic discovery method of a mobile network prefix for a MNN in a mobile network, in accordance with the preferred embodiment of the present invention;

FIG. 17, FIG. 18, and FIG. 19 illustrate flowcharts of processes of MNN routers sending a mobile network prefix advertisement message, in accordance with the preferred embodiment of the present invention;

FIG. 20 illustrates a flowchart of a first node sending a data packet to a second node, in accordance with the preferred embodiment of the present invention;

FIG. 21 illustrates preferred examples of data packet formats sent by a first node to a second node, in accordance with embodiments of the present invention;

FIG. 22 and FIG. 23 illustrate a mobile network prefix solicitation message and a mobile network prefix advertisement message respectively, in accordance with the preferred embodiment of the present invention;

FIG. 24 and FIG. 25 illustrate a care-of route solicitation message and a care-of route advertisement message respectively, in accordance with the preferred embodiment of the present invention;

FIG. 26 and FIG. 27 illustrate an extended BU message sent from a LFN and a VMN respectively, in accordance with the preferred embodiment of the present invention;

FIG. 28 illustrates an extended binding cache in accordance with the preferred embodiment of the present invention;

FIG. 29 illustrates the construction of a care-of-source route from a received extended BU in accordance with the preferred embodiment of the present invention; and FIG. 30 is a flowchart that illustrates a process of a first node receiving an extended BU from a second node in accordance with embodiments of the present invention.

DESCRIPTION OF PREFERRED
EMBODIMENTS

There is currently no standard mechanism to support Network mobility adequately, particularly in the case of IPv6 for nested mobility data networks. In particular, there is no provision or support for route optimisation.

This is a major issue, as nested mobility is a very realistic scenario for Mobile Router applications. In addition route optimisation is much more important with regard to movement of a Mobile Network, than for movement of a single Mobile Node, since the amount of traffic handled is much greater.

The preferred embodiment of the present invention is described with respect to route optimisation in transmitting at least one data packet between a corresponding node (communication unit) and a local fixed node (or vice versa). In this context, route optimisation may be viewed as "the-shortest-path" direct communication between a Mobile Network Node (MNN) and its Correspondent Nodes (CNs), particularly for an MNN within a Mobile Network where a nested mobility (Mobile Networks visiting Mobile Networks) scenario exists.

It is envisaged that the corresponding node may be any communication unit capable of sending a data packet across a data network (such as the Internet), for example, a web server, a PC, or a workstation running a web server such as www-.yahoo.com, etc. The CN may also be any mobile data communication unit such as a general packet radio system (GPRS) device or a $3^{rd}$ generation (3G) cellular phone, a personal digital assistant (PDA), etc., connected to the data network through any type of access. Note that the CN may also itself be located in a mobile network.

As explained in the previous section, a Mobile Router (MR) must send a Binding Update (BU) message to its Home Agent (HA) when moving to a Foreign Network. By sending a BU message to its HA, the MR maintains IP reach-ability for itself as well as for nodes it serves (MNNs).

In accordance with the preferred embodiment, no restriction is placed on the mechanism to be used by the Mobile Network to inform its Home Agent about its new location. In this regard, any known approach such as those described in [3] Thierry Ernst, Hong-Yon Lach, IETF Internet-Draft draft-ernst-mobileip-v6-network-02.txt, June 2001, or [5] T. J. Kniveton, IETF Internet-Draft draft-kniveton-mobrtr-00.txt, November 2001, may be adapted and used. The adaptation of such techniques enables route optimisation to be achieved in cases of nested Mobility.

Furthermore, in an enhanced embodiment of the present invention, it is shown how the approaches in [3] Thierry Ernst, IETF Internet-Draft draft-ernst-mobileip-v6-network-02.txt, June 2001, and [5] may be leveraged in order to also achieve route optimisation on the path HA→MN (where MN is either a host or a router).

The preferred embodiment of the present invention utilises three key concepts, which are used either singly or preferably in combination. The three key concepts are:

(i) Advertising a Mobile Router's mobility within its Mobile Network.

(ii) Sending of one or more extended Binding Update messages by MNNs to their respective CNs. An extended Binding Update message sent by a MNN would include a "care-of route" instead of a single care-of address in vanilla Mobile IP. The care-of route is an ordered list of IP addresses that a CN will use to source route its packets to the MNN on the shortest path, thereby achieving route optimisation.

(iii) Receiving of extended BU messages by the CNs. In response to the received BU messages, source route packets addressed to MNN through the route derived from the care-of route address in order to achieve route optimisation.

(A) Mobile Router Advertising its Mobility in the Mobile Network:

In order to realize route optimisation for MNNs in the case of a single Mobile Network, as well as multi-layered aggregated Mobile Networks (nested mobility), the inventive concepts described herein propose to make MNNs aware of the mobility of the Mobile Networks (or Mobile Routers) that they are attached to. This is in direct contrast to the approach proposed in [3] where a Mobile Router's mobility is hidden to its respective MNNs.

In order to announce it has moved to a new point of attachment, a Mobile Router (e.g. MR1) will send a "Care-of Route Advertisement" message into the Mobile Network it serves addressed to all the nodes behind it (i.e. any LFNs, LMNs, VMNs). This message contains the Care-of address of the MR1 itself, as well as the care-of addresses of all the Mobile Routers above MR1 in the hierarchy of aggregated Mobile Networks, in the case of nested network mobility. This list of above mobile routers' care-of addresses is preferably ordered and constructed dynamically through all the Care-of Route Advertisement sent at each level of the hierarchy of aggregated Mobile Networks.

Referring now to FIG. 6, a network topology 600 for advertising such a mobile router's mobility within mobile networks, is illustrated, in accordance with the preferred embodiment of the present invention. In particular, the topology shown in FIG. 6, illustrates the supporting nested mobility, in accordance with the preferred embodiment of the present invention. A skilled artisan would recognise that the number of elements shown in the network of FIG. 6 are limited for clarity purposes only.

The network topology shown in FIG. 6 illustrates a second Mobile Network (MR2) visiting a first Mobile Network (MR1) that is attached to a visited network. The first Mobile Network includes a fixed router (LFR1) that serves its own link.

Since MR1 650 is visiting a foreign network 110, it has acquired a Care-of Address {MR1_CoA} 652. The foreign network 110 is fixed, so there is no Care-of Route Advertisements forwarded in the link between the visited link 110 and MR1 650. In accordance with the preferred embodiment of the present invention, MR1 650 constructs its own Care-of Route Advertisement message and includes its own Care-of Address 652 in the advertisement message.

This message is multicasted to all nodes within (below) its own link (MR1 Link 155) through its ingress interface. All nodes on the link will therefore receive this advertisement message. When receiving such a message, Routers (LFR, LMR, VMR) are expected to extract the ordered list of Care-of addresses 652 and forward this list on to the links that they serve. In this regard, the second MR (MR2) 660 forwards the Care-of addresses 652 to its own link (MR2 link) 230. If this router is a top router of a Mobile Network not within its home network (i.e. a VMR as in the case of MR2 660), it will append its own Care-of address to the list received. M2 660 will then include the MR2 Care-of address 662 in the generation of a new ordered-list. MR2 will then generate its own Care-of Route Advertisement message to be multicasted on its own link (MR2 link) 230, through its ingress interface. As a consequence, MR1_CoR is advertised in the first Mobile Network (including MR1 link 155 and LFR1 link 670) whilst the ordered-list {MR1_CoR 652, MR2_CoR 662} is advertised in the second Mobile Network 230.

The process of informing CN2 655 of the optimum route to LFN2 665 via the MR2 care-of-address 662, using an extended BU message, is described later. In this manner, the full route for the data packet can be determined by improved extraction, utilisation and advertisement of address data throughout the networks.

The process shown in FIG. 6 illustrates a practical scenario, where many nested levels may exist. Hence, a skilled artisan would appreciate that the aforementioned process may be easily generalised to an example of nested mobility involving n successive levels (n mobile routers $MR_1, \ldots, MR_n$ and n corresponding home agents $HA_1, \ldots, HA_n$).

Referring now to FIG. 7, FIG. 8 and FIG. 9, various flowcharts 700, 800, 900 are illustrated for any router in a mobile network, such as MR VMR LFR and LMR, to construct and send a list of care-of addresses to be included in a Care-of Route advertisement (CoR_Advt) message, in accordance with the preferred embodiment of the present invention. Also, these processes are valid only for MNN that are routers (e.g. LFR, MRs).

Basically, a router in a Mobile Network will send a CoR_Advt message in response to one of three events:
 (i) Reception of a CoR_Advt on its egress interface that modifies its own CoR, as described in FIG. 7;
 (ii) Periodic sending of a CoR_Advt, as described in FIG. 8; and
 (iii) Reception of a Care-of route solicitation (CoR_Sol) message on an ingress ifc, as described in FIG. 9.

In FIG. 7, the process starts at step 710. A new CoR_Advt message is received on its egress interface, as shown in step 720, and the list of care-of addresses extracted, as described further in process A of FIG. 11. If the respective MNN's Care-of Route (MNN_CoR) has not been changed in step 740, the process ends in step 780. However, if the respective MNN_CoR address has been changed in step 740, the router builds a new CoR_Advt message and includes (appends) in it the new MNN_CoR, as shown in step 750. The new CoR_Advt message is then sent to all nodes through all ingress interfaces of the respective MNN, as in step 760.

In FIG. 8, a flowchart illustrates the preferred operation if a periodic CoR_Advt message timer has expired in step 820. In this case, the router builds a new CoR_Advt message and includes (appends) in it to the MNN_CoR, as shown in step 850. The new CoR_Advt message is then sent to all nodes through all ingress interfaces of the respective MNN, as in step 860. The CoR_Advt message timer is then re-started in step 870.

A router in a mobile network (MR, LFR, LMR, VMR) will start periodic transmission of CoR_Advt messages only when its CoR becomes non-null (i.e. contains at least one address). It is envisaged that the router will terminate this periodic emission when its CoR becomes null/empty. For example, a MR will start the periodic emission when it (or a top MR) is moving out of its home network and terminate the periodic transmission when it (or the top MR) is returns to its home network.

In FIG. 9, a flowchart illustrates the preferred process upon reception of a Care-of route solicitation (CoR_Sol) message on an ingress ifc, as shown in step 920. In this case, the router builds a new CoR_Advt message and includes (appends) in it MNN_CoR, as shown in step 950, when the (CoR_Sol) message is received on an ingress interface ifc_j. Two possible approaches are envisaged for the sending of a CoA_Advt operation in step 960. A first approach is to send the CoA_Advt message to the source address of the care-of Route Solicitation message (CoR_Sol) through ifc_j. Alternatively, the CoA_Advt message may be sent to all nodes on the links through the ifc_j. Note that when a mobile router (MR) changes its location, it should send a CoR_Sol message, in order to receive a CoR_Advt message in return. The MR is then able to compute its new Care-of Route (CoR). This CoR will be made of the ordered list of addresses received in the CoR_Advt message (if not empty) to which MR's new Care-of address is appended. Since this new CoR is not empty, the MR will then start periodic sending of its own CoR_Advt messages.

Several approaches are envisaged for the implementation of Care-of Route Solicitation and Care-of Route Advertisement messages. First, the messages may be implemented as an Internet Control Message Protocol for IPv6, IETF RFC 1885 (ICMPv6) extension, or as any new protocol on top of IP(v4 or v6), such as User Datagram Protocol, IETF RFC 768 (UDP), Transmission Control Protocol, IETF RFC 793 (TCP), etc.

Secondly, a Care-of Route Advertisement message may be sent to the IPv6 all-node link-local multicast address. In this case, the message will be sent only on the local link. A preferred manner would be to send the Care-of Route Advertisement to the IPv6 all-node site-local multicast address, where the site is the whole Mobile Network served by this MR. This would help reduce operation on intermediate routers (LFR, LMR at home) in the Mobile Network since the Care-of Route Advertisement would then be forwarded transparently to all the links of the Mobile network. In this manner, there is no need for this intermediate router (LFR, LMR at home) to extract and copy the CoR list.

A preferred implementation of these messages would be to define them as extensions of ICMPv6 Router Solicitation and ICMPv6 Router Advertisement messages. A Care-of Route Advertisement message would be an ICMPv6 Router Advertisement message (RA) including a new "Care-of Route Advertisement" option. A Care-of Route Solicitation message would be an ICMPv6 Router Solicitation message (RS) including a new "Care-of Route Advertisement" option. The Care-of Route Advertisement option would be included in RA when a router has to announce its (non-empty)_CoR within the mobile network. The Care-of Route Solicitation option may be included in RS by a MNN to explicitly request for a RA with the Care-of Route Advertisement option. If this option were not included in the RA, this would mean that the CoR of this router is null/empty.

Referring now to FIG. 24 and FIG. 25, a Care-of Route Solicitation message and a Care-of Route Advertisement message are illustrated respectively, in accordance with the preferred embodiment of the present invention.

The Care-of Route Solicitation (CoR_Sol) message 2400 in FIG. 24 is an ICMPv6 Router Solicitation message, extended with the new "Care-of Route Solicitation" option. It includes a single IP header 2425 that includes an IP source address 2410 for a host and an IP destination address 2420 indicating the all-routers IP multicast address. The IP header 2425 is followed by a router solicitation message 2430 containing the Care-of Route Solicitation (CoR_Sol) option.

The Care-of Route Advertisement (CoR_Advt) message 2500 in FIG. 25 is an ICMPv6 Router Advertisement message extended with the new "Care-of Route Advertisement" option. It includes a single IP header 2525 that includes an IP source address 2510 for a router's ingress interface and an IP destination address 2520 indicating a node (or all nodes on the link) that is to receive the packet. The IP header 2525 is followed by a router advertisement message 2530 containing the Care-of Route Advertisement option that includes the Care-of Route (i.e. ordered list of addresses) as advertised by the router.

B) MNNs Sending Extended Binding Updates to Their Respective CNs:

Any MNN, including a LFN, a LMN or a VMN, in a Mobile Network is expected to send so-called extended Binding Updates to its CNs in order to achieve route optimisation on the path CN→MNN. In accordance with the preferred embodiment of the present invention, an extended BU message sent by a MNN would include a "care-of route" instead of a single care-of address, as known in Mobile IP. As described above, the care-of route is the ordered-list of IP addresses for the CN to derive a source route from, in order to route its packet to the MNN through the shortest path (i.e. route optimisation).

Referring now to FIG. 10, a network topology 1000 for sending extended BUs to CNs, is illustrated in accordance with the preferred embodiment of the present invention. For clarity purposes only, the topology follows on from that described above with respect to FIG. 6.

Each MNN in the Mobile Network derives its care-of route from the Care-of Route Advertisement messages it receives from its upper router. For instance, LFN1 675 care-of route is a single hop route equal to MR1 650's Care-of Address {MR1_CoA} 652. LFN1 675 then transmits an extended BU message 1010 indicating its care-of route to CN1 1030.

In contrast, LFN2 665's care-of route is a two-hop route equal to {MR1_CoA→MR2_CoA}. In this context, the LFN2 665 Care-of Route utilises MR2 CoA 662 and the upper router from MR2, namely MR1 650's CoA 652. LFN2 665 then transmits an extended BU message 1020 indicating the MR1_CoA 652 and the MR2 CoA 662 to CN2 655.

Referring now to FIG. 11, a preferred algorithm for a MNN to generate its own care-of route (MNN_CoR), in accordance with embodiments of the present invention, is described. The process (process A) starts at step 1110. When the MNN receives a new CoR_Advt message on its interface ifc_i, in step 1120, it determines whether it is an egress interface, in step 1130. If it is not an egress interface, the CoR_Advt is ignored and the process ends in step 1190. In this case, the MNN Care-of Route is unchanged.

If ifc_I in an egress interface, then the MNN extracts a new CoR (new_CoR)—ordered list of IP addresses—from the CoR_advt in step 1140, and a determination is made as to whether the MNN is at home (i.e. ifc_i is attached to its home IP subnet) in step 1150. If the MNN is at home, the MNN_CoR is replaced by the new Care-of Route information in step 1180, if there is a difference between the routes in step 1170. If the MNN is not at home, the MNN care-of route is constructed by appending the MNN care-of address (obtained in the visited network) to the ordered-list of care-of addresses received in the care-of route advertisement message, in step 1160.

Note that a MNN may not maintain such a Care-of Route if it does not intend to benefit from route optimisation on the path CN→MNN, or on the path HA→MNN. However, in the preferred embodiment of the present invention, it is recommended that such Care-of Route knowledge be maintained, in order to leverage the approaches described in [3] and [5]. In this manner, it is possible to achieve route optimisation on the path HA→MN, where the MN is either a host or a router, as described later.

Note that the approach described in FIG. 11 is valid for any MNN, either a router or a host, either fixed or mobile.

Referring now to FIG. 12 and FIG. 13, flowcharts of an MNN sending extended BU messages to its CN(s) (and Home Agent—HA), are illustrated in accordance with the preferred embodiments of the present invention. The flowcharts are again applicable to any MNN, either a host or a router, fixed or mobile.

FIG. 12 describes a flowchart 1200 for sending extended BU messages to its CN(s) (and HA) following a reception of a CoR_Advt message on its egress interface, in step 1215. Upon reception of a CoR_Advt message, the MNN performs process 'A' described in FIG. 11, to generate its own CoR, as shown in step 1220. If its CoR has not changed in step 1225, the process ends, in step 1265. However, if the CoR has changed in step 1225, the MNN determines all of its CNs that need to receive an updated CoR message, in step 1230. In order to send an extended BU message containing the updated CoR message, in step 1240, the MNN steps through each of the CNs, starting with the first CN in step 1235. If the CN receiving the extended BU message containing the updated CoR message transmission is not the last CN identified by the MNN, in step 1245, the process moves to the next CN in step 1250 until all CNs have received the transmission.

A preferred, optional step is for the MNN, which is not at home, to send a message including its new Care-of Route (CoR) to its Home Agent (HA), either an Extended BU or an Extended Prefix Scope BU (if the MNN used [3] to send BU to its HA), as shown in steps 1255 and 1260.

FIG. 13 describes an alternative flowchart 1300 for sending extended BU messages to its CN(s) (or its HA) following periodic sending of extended BUs (EBUs) to CNs (and again HA if MNN is a mobile host or router). Again, this periodic sending takes place only when the MNN's CoR is non-null following expiration of the periodic EBU timer associated to a particular CN (e.g. CNi) or MNN's HA, in step 1320. The extended BU message containing the updated CoR message is sent to CNi (or HA) in step 1330. The timer function, associated to the respective CN (e.g. CNi or HA), is then re-started in step 1340.

Note that in relation to FIG. 12 and FIG. 13, a CN may be a fixed or mobile host in the Internet as well as another MNN (from the same or different Mobile Network).

Still referring to FIG.12 and FIG. 13, if the MNN (host or router) is at home (i.e. is a LFN, a LMN at home), the MNN sends an extended Binding Update to all its CNs (and not to its HA since it is at home). If the MNN (host or router) is in a visited network (i.e. is a VMN), the MNN sends an extended Binding Update to all its CNs as well as preferably its Home Agent.

The MNN may send an extended Binding Update to its Home Agent, in case it wants to achieve route optimisation on the path HA→MNN. This approach extends the techniques proposed in [3] and [5], by sending extended BUs instead of their basic Binding Updates. In the case of [3], the Mobile Router (MR) sends a so-called prefix scope BU message to its HA. In this context, we define here an extension of this binding update message called 'extended prefix-scope binding update', which includes the MR Care-of route instead of only MR care-of address. This extended prefix-scope binding update may be sent by the MR to its HA to achieve route optimisation on the path HA→MR.

In the case of [5], the Mobile Router (MR) sends a basic Mobile IP binding update. In this context, we define an extension of this BU message as an 'extended Binding Update' (as detailed above). This includes the MR Care-of Route instead of only MR care-of address. This extended binding update may be sent by the MR to its HA to achieve route optimisation on the path HA→MR.

It is worth mentioning that each MNN that sends extended BU messages preferably maintains an 'extended Binding List', defined as an extension of the Mobile IP binding list, where Care-of Addresses are replaced with Care-of Routes.

Referring now to FIG. 14 and FIG. 15 illustrate flowcharts of an optimised process for an MNN sending an extended BU to its CN(s) (and its HA) for intra-mobile-network communication, in accordance with an enhanced embodiment of the present invention. It is envisaged that the enhanced process improves network performance by avoiding sending "useless" extended BU messages in the case of intra-mobile-network communication. In fact, when two nodes (either fixed, or mobile at home) in the same mobile network (i.e. not separated by a Mobile Router away from home) are sending packets to each other, route optimisation will be realised naturally by the routing infrastructure within the mobile network. As such, there is no need for them to exchange extended BU messages between each other.

In FIG. 14, as an extension to the flowchart of FIG. 12, when the MNN is a host at home (i.e. is a LFH, or a LMH at home), the MNN sends an extended Binding Update to only its CNs that are not in the same mobile network; as in step 1410. Also, when the MNN is a router at home (i.e. is a LFR, or a LMR at home), the MNN sends an extended Binding Update to only its CNs that are not in the same mobile network, as in step 1410. If the MNN (host or router) is in a visited network (i.e. is a VMN) in step 1420, the MNN sends an extended Binding Update to only CNs that are not in this visited mobile network, in step 1240. For CNs that are in the visited mobile network, the MNN may send an extended Binding Update, or preferably send a modified extended Binding Update where only one address is specified in the care-of route, i.e. only the MNN's own care-of address, in step 1430.

The mobile MNN (host or router) preferably sends also a Binding Update to its Home Agent in step 1260 and 1450. Two cases are considered below, in this regard. When the MNN has moved out of its home mobile network, the MNN preferably sends an extended Binding Update to its HA. When the MNN is in a foreign IP-subnet within its home mobile network, the MNN may send an extended Binding Update. Alternatively, the MNN may send a modified extended Binding Update where only one address is specified in the care-of route, i.e. its own Care-of Address.

Again, it is envisaged that the MNN may send an extended BU message to its Home Agent, in the case where the MNN wants to achieve route optimisation on the path HA→MNN, by sending extended BUs in the operation of [3] or extended prefix scope BUs in the operation of [5] as described above.

A similar enhancement to FIG. 13 is described in FIG. 15, with the transmission of extended BU messages-containing only the MNN_CoA to respective CNs that are operating in the same Mobile Network as the MNN, as shown in steps 1510, 1520, 1530.

Referring now to FIG. 26 and FIG. 27 an extended BU message sent from a LFN and a VMN are illustrated respectively, in accordance with the preferred embodiment of the present invention.

The extended BU message sent from a LFN message 2600 in FIG. 26 includes a single IP header 2625 that includes as IP source address 2610 the LFN and as IP destination address 2620 for the CN's address. The IP header 2625 is followed by a Mobile IPv6 BU message 2630 containing the Care-of Route mobility option incorporating the LFN's Care-of Route.

The extended BU message sent from a VMN message 2700 in FIG. 27 includes a single IP header 2725 that includes an IP source address 2710 of the VMN care-of address and an IP destination address 2720 for the CN. The IP header 2725 is followed by a Mobile IPv6 BU message 2730 containing the Care-of Route mobility option incorporating the VMN's Care-of Route.

Referring now to FIG. 16 a flowchart 1600 of a dynamic discovery method of a mobile network prefix for any MNN in a mobile network is illustrated, in accordance with the enhanced embodiment of the present invention described above. In this context, a node such as a MNN is able to know whether a second node, say its CN, is in the same current Mobile Network as itself when sending an EBU to say the CN, as described above.

The process (process B) starts at step 1610. When the MNN receives a new Mobile Network Prefix Advertisement message (Mobile_Network_Prefix_Advt) on its interface ifc_i, in step 1620, it determines whether it is an egress interface, in step 1630. If it is not an egress interface, the Mobile_Network_Prefix_Advt is ignored and the process ends in step 1670. In this case, the MNN's mobile network prefix (MNN_Mobile_Netowrk_Prefix) is unchanged. If ifc_i in an egress interface, then the MNN extracts a new Mobile Network Prefix (new_Mobile_Network_Prefix) and its prefix length (new_Mobile_Network_Prefix_Length) from the Mobile_Network_Prefix_Advt in step 1640, and a determination is made as to whether the MNN's home address in ifc_i matches New_Mobile_Network_Prefix on the first New_Mobile_Network_Prefix_Length bits, in step 1650. If it matches, the MNN_Mobile_Network_Prefix and MNN_Mobile_Network_Prefix_Length are replaced by the new information in step 1650, and the process ends in step 1670. If there is not a match, the process ends directly in step 1670.

Note that the approach described in FIG. 16 is valid for any MNN, either a router or a host, either fixed or mobile.

Referring now to FIG. 17, FIG. 18 and FIG. 19, various flowcharts 1700, 1800, 1900 are illustrated for a fixed router in a mobile network (i.e. LFR) to construct and send its own Mobile Network Prefix Advertisement (Mobile_Network_Prefix_Advt) messages, in accordance with the enhanced embodiment of the present invention.

Basically, a fixed router in a Mobile Network will send a Mobile_Network_Prefix_Advt message in response to one of three events:

(i) Reception of a Mobile_Network_Prefix_Advt on an egress interface that modifies its own MNN_Mobile_Network_Prefix, as described in FIG. 17;

(ii) Periodic sending of a Mobile_Network_Prefix_Advt, as described in FIG. 18; and (iii) Reception of a Mobile Network Prefix Solicitation message (Mobile_Network_Prefix_Sol) on an ingress ifc, as described in FIG. 19.

In FIG. 17, the process starts at step 1705. A new Mobile_Network_Prefix_Advt message is received on an egress interface, as shown in step 1710, and the new Mobile Network Prefix (New_Mobile_Network_Prefix) and its length are extracted, as described further in process B of FIG. 16. If the respective MNN_Mobile_Network_Prefix and MNN_Mobile_Network_Prefix_Length have not been changed in step 1720, the process ends in step 1735. However, if the respective MNN_Mobile_Network_Prefix and/or MNN_Mobile_Network_Prefix_Length have been changed in step 1720, the router builds a new Mobile_Network_Prefix_Advt message and includes (appends) in it the new MNN_Mobile_Network_Prefix and MNN_Mobile_Network_Prefix_Length, as shown in step 1725. The new Mobile_Network_Prefix_Advt message is then sent to all nodes through all ingress interfaces of the respective MNN, as in step 1730. The flowchart described in FIG. 17 only applies to a fixed router in a mobile network.

In FIG. 18, a flowchart illustrates the preferred operation if a periodic Mobile_Network_Prefix_Advt message timer has expired in step 1810. In this case, the router builds a new Mobile_Network_Prefix_Advt message and includes (appends) in it the MNN_Mobile_Network_Prefix and MNN_Mobile_Network_Prefix_Length, as shown in step 1815. The new Mobile_Network_Prefix_Advt message is then sent to all nodes through all ingress interfaces of the respective MNN (fixed router), as in step 1820. The Mobile_Network_Prefix_Advt message timer is then re-started in step 1825. The flowchart of FIG. 18 applies to any router in a mobile network (MR, LMR, LFR, VMR).

A router in a mobile network (MR, LFR, LMR, VMR) will start periodic transmission of Mobile_Network_Prefix_Advt messages only when its CoR becomes non-null (i.e. contains at least one address). It is envisaged that the router will terminate this periodic emission when its CoR becomes null/empty. For example, a MR will start the periodic emission when it (or a top MR) is moving out of its home network and terminate the periodic transmission when it (or the top MR) has returned to its home network.

In FIG. 19, a flowchart illustrates the preferred process upon reception of a Mobile Network Prefix Solicitation message (Mobile_Network_Prefix_Sol) on an ingress ifc, as shown in step 1910. In this case, the router builds a new Mobile_Network_Prefix_Advt message and includes (appends) in it MNN_Mobile_Network_Prefix and MNN_Mobile_Network_Prefix_Length, as shown in step 1920, when the (Mobile_Network_Prefix_Sol) message is received on an ingress interface ifc_j. Two possible approaches are envisaged for the sending of a Mobile_Network_Prefix_Advt operation in step 1925. A first approach is to send the message to the source address of the Mobile Network Prefix Solicitation message (Mobile_Network_Prefix_Sol) through ifc_j. Alternatively, the Mobile Network Prefix Advertisement message may be sent to all nodes on the links through the ifc_j. The flowchart of FIG. 19 applies to any router in a mobile network (MR, LMR, LFR, VMR).

Note that when a mobile router (MR) changes its location (and thus get a non-null CoR), it should send a Mobile_Network_Prefix_Advt on its ingress interfaces.

This mobile router may know this prefix from its internal configuration. On the other hand, fixed routers in the mobile network (i.e. LFR) may not a-priori know the mobile network prefix they belong to and can discovery it dynamically thanks to the process described in FIG. 17. Such fixed routers may of course send a Mobile_Network_Prefix_Sol message, in order to receive a Mobile_Network_Prefix_Advt message in return.

Several approaches are envisaged for the implementation of Mobile Network Prefix Solicitation and Mobile Network Prefix Advertisement messages. First, the messages may be implemented as ICMPv6 extension, or as any new protocol on top of IP, UDP, TCP, etc. ICMP, UDP and TCP are protocols that build upon IP(v4 or v6):

ICMPv6: Internet Control Message Protocol for IPv6, IETF RFC 1885

UDP: User Datagram Protocol, IETF RFC 768

TCP: Transmission Control Protocol, IETF RFC 793

Secondly, a Network Prefix Advertisement message may be sent to the IPv6 all-node link-local multicast address. In this case, the message will be sent only on the local link. A preferred manner would be to send the Care-of Route Advertisement to the IPv6 all-node site-local multicast address, where the site is the whole Mobile Network served by this MR. This would help reduce operation on intermediate routers (i.e. LFR) in the Mobile Network since this message would then be forwarded transparently to all the links of the Mobile network. In this manner, there is no need for this intermediate router (i.e. LFR) to extract and copy the Mobile Network Prefix.

A preferred implementation of these messages would be to define them as extensions of ICMPv6 Router Solicitation and ICMPv6 Router Advertisement messages. A Mobile Network Prefix Advertisement message would be an ICMPv6 Router Advertisement message (RA) including a new "Mobile Network Prefix Advertisement" option. A Mobile Network Prefix Solicitation message would be an ICMPv6 Router Solicitation message (RS) including a new "Mobile Network Prefix Advertisement" option. The Mobile Network Prefix Advertisement option would be included in RA when a router has to announce the mobile network prefix within the mobile network. The Mobile Network Prefix Solicitation option may be included in RS by a MNN to explicitly request for a RA with the Mobile Network Prefix Advertisement option.

Referring now to FIG. 22 and FIG. 23, a mobile network prefix solicitation message and a mobile network prefix advertisement message are illustrated respectively, in accordance with the preferred embodiment of the present invention.

The mobile network prefix solicitation message 2200 in FIG. 22 is an ICMPv6 Router Solicitation extended with the new Mobile Network Prefix Solicitation option. It includes a single IP header 2225 that includes an IP source address 2210 for a host and an IP destination address 2220 indicating the all-routers IP multicast address. The IP header 2225 is followed by the router solicitation message 2230 containing the mobile network prefix solicitation option proposed in this document.

The mobile network prefix advertisement message 2300 in FIG. 23 is an ICMPv6 Router Advertisement message extended with the new mobile network prefix advertisement option. It includes a single IP header 2325 that includes an IP source address 2310 for a router's ingress interface and an IP destination address 2320 indicating a node (or all nodes on the link) that is to receive the packet. The IP header 2325 is followed by the router advertisement message 2330 containing the mobile network prefix advertisement option that includes the mobile network prefix and the mobile network prefix length advertised by the router.

C) Correspondent Nodes and Home Agent Receiving Extended Binding Update:

Referring now to FIG. 20, a flowchart 2000 illustrates a process for a first node to send a data packet to a second node based on the parsing of its Extended Binding Cache (EBC), in accordance with the preferred embodiments of the present invention. A first node, for example a CN or HA, receives an indication that a data packet is to be sent to a second node, for example a MNN, as shown in step 2020. The CN searches for the MNN's address within an extended binding cache (EBC) that stores the Care-of Source routes derived from care-of route information received in extended BUs, as in step 2030.

If the MNN's address is found, in step 2040, the CN (or HA) is able to source route the packet, through the Care-of Source route found in the EBC, to the MNN's address achieving route optimisation, as in step 2050. Otherwise, the CN sends the data packet to the MNN directly to MNN's Home Address using the known technique, as shown in step 2060.

Referring now to FIG. 21, preferred examples of data packet formats, sent by a first node, say a CN, to a second node, say a MNN, are illustrated in accordance with the preferred embodiments of the present invention. A first format of a data packet 2100 includes a single IP header 2110 that includes an IP source address 2112 and an IP destination address 2114 equal to the first IP address in CN's Care-of Source Route to MNN. The single IP header 2110 is followed by a routing header 2120 containing the (m−1) other addresses (from CN's Care-of Source route to MNN) in the route to the second node. The data payload 2130 follows the routing header.

A second format of a data packet 2150 includes 'm' consecutive IP headers each including respective IP source addresses 2112, 2152, 2162, 2172 and respective IP destination addresses 2114, 2154, 2164, 2174. The 'm' consecutive IP headers do not therefore need a separate routing header, so the data payload 2180 follows the IP headers. Each of the consecutive IP headers has its IP destination address set equal to one of the IP addresses of CN's Care-of Source route to MNN. The fist header contains the first address of the Care-of Source Route (CoSR), the second header contains the second address, and so on to the last header. The final IP header 2172, 2174, together with the data payload 2180, constitutes the original packet 2190 to be sent from the first node to the second node.

Each node (CN, MNN, HA) that is expected to receive extended Binding Updates is to maintain an extended Binding Cache (EBC). The EBC is herein defined as an extension of Mobile IP binding cache where care-of addresses are replaced with "care-of source routes" (CoSR) derived from the care-of routes (CoR) received in the extended Binding Updates. It is worth mentioning that the care-of source route listed in the extended binding cache may be slightly different (i.e. shorter) from the care-of route received in the extended Binding Update.

Referring now to FIG. 28 an extended binding cache 2800 is illustrated in accordance with the preferred embodiment of the present invention.

The extended binding cache 2800 includes a list of entries 2810, 2840, 2870, each one specific to a home address of a MNN. The extended binding cache entry 2810 includes, for example, a first home address 2815, with a link 2818 to a first Care-of Source route 2820, if one has been determined. The first Care-of Source route 2820 includes respective linked Care-of Source route addresses 2825, 2830, and 2835 to identify the route to the first home address. The first entry 2810 is linked 2837 to a second entry 2840 having a link 2848 from a second home address 2845 to a second Care-of Source route 2850, if one has been determined. The second Care-of Source route 2850 includes respective linked Care-of Source route addresses 2855, 2860, and 2865 to identify the route to the second home address. A similar arrangement and link 2867 is performed to a third entry 2870, and so on.

It is within the contemplation of the invention that the extended BU may also include entries for a mobile router (MR) prefix and prefix length. This is particularly useful when an MR sends an extended prefix-scope BU to its HA or CNs, as an extension to [3], where the CoR replaces the CoA in the prefix-scope binding update. In this case, the Home Address field is replaced with a "prefix and prefix length" field in the EBC of the respective HA or CNs.

Referring now to FIG. 29, the construction of a care-of-source route 2900 from a received extended BU is illustrated, in accordance with the preferred embodiment of the present invention. A first node Care-of Route (N1_CoR) contains an ordered list of Care-of Route addresses (N1_CoR[1], N1_CoR[2], . . . ) 2910. When the first node N1 receives an extended BU message from a second node N2 containing N2's Care-of Route (N2_CoR), the first node compares the two ordered list of Care-of Route addresses, to determine when there is a difference between them 2940. The address from N2_CoR that was determined as being different, and all subsequent addresses from N2_CoR, is then used to generate a new Care-of Source Route 2930 for data packet transmissions from N1 to N2. This process is further described with respect to the flowchart of FIG. 30.

Referring now to FIG. 30, a flowchart 3000 a process of determining a Care-of Source Route to be included in an extended Binding Cache is illustrated, in accordance with preferred embodiments of the present invention. A first node (N1) receives an extended Binding Update from a second node (N2) and needs to determine the care-of source route to be included in the extended Binding Cache for this entry (N2).

The process starts at step 3002. When a first node (N1, which may be itself a MNN at home or in a foreign network, or any host in the topology) receives an EBU containing a new Care-of Route for a second node (N2), in step 3004, N1 determines whether this N2 Care-of Route (received in the EBU) is empty in step 3006.

If the new Care-of Route for N2 received in the EBU is empty, in step 3006, N1 searches through its extended Binding Cache to check whether there is an entry (i.e. a care-of source route) for this second node in the EBC, as shown in step 3008. If no entry exists in the EBC, the process ends in step 3046. In this case, no entry in N1's extended binding cache is needed for N2. When addressing packet to N2's home address, the data packet from N1 will be directly on the shortest path (route optimisation is achieved without needing source routing). However, if an entry exists in the EBC in step 3008, the second node entry is removed (i.e. N1_CoSR(to N2)) in step 3010, before the process ends at step 3046.

If the new N2 Care-of Route received in the EBU is not empty, in step 3006, a determination is made in step 3012 as to whether a Care-of Route entry is available for the first node. If a Care-of Route is not available for the first node in step 3012, a first node (N1) Care-of Source Route to the second node (N2) is generated to be equal to the second node Care-of Route (N1_CoSR(to N2):=N2_CoR), as shown in step 3014. N1 then searches through its extended Binding Cache to check whether there is an entry (i.e. a care-of source route) for this second node in the EBC, as shown in step 3016. If no entry exists in the EBC, an entry for N2 is added to the EBC (N1_CoSR(to N2)), in step 3020 and the process ends in step 3046. If an entry exists in the EBC in step 3016, the second node entry is updated (i.e. N1_CoSR(to N2)) in step 3018, before the process ends at step 3046.

If the first node has its own Care-of Route in step 3012, all addresses in the two nodes care-of routes (N1 and N2) are searched, starting with setting a counter (i=0) in step 3022. N1 compares, one by one, the IP addresses in its own care-of route (N1_CoR) with the IP addresses listed in the care-of route of the extended Binding Update received from node N2, in step 3024.

It starts with the first addresses N1_CoR(1) and N2_CoR(1), and continues thereafter. If a match for a particular address of the first and second nodes care-of routes is found, in step 3026, a determination is made as to whether the second node Care-of Route address is the last address, in step 3028. If it is the last address, the complete Care-of Route of N2 has been searched, in step 3030, and the process moves to step 3008 as described above. If the second node Care-of Route address is not the last address, in step 3028, a determination is made as to whether the first node Care-of Route address is the last address for the first node, in step 3032. If the first node Care-of Route address is not the last address, in step 3032, the counter is incremented in step 3034, and the next addresses searched in step 3024. If the first node Care-of Route address is the last address, in step 3028, or no match was found in step 3026, the searching process stops in step 3036 and the care-of source route to N2, from N1, is set in 3038.

In 3038, the care-of source route to N2, from N1, is set to be equal to ordered list of addresses part of N2's care-of route starting from the $i^{th}$ address to the last one. This $i^{th}$ address being the one where the loop in N2's care-of route addresses stopped in step 3036. That is: N1_CoSR(to N2)={N2_CoR(i)→N2_CoR(i+1)→ . . . →N2_CoR(n-1)→N2_CoR(n)}. N1 then searches through its extended Binding Cache to check whether there is an entry (i.e. a care-of source route) for this second node in the EBC, as shown in step 3040.

If no entry exists in the EBC, an entry for N2 is added to the EBC (N1_CoSR(to N2)), in step 3042 and the process ends in step 3046. If an entry exists in the EBC in step 3040, the second node entry is updated (i.e. N1_CoSR(to N2)) in N1's EBC in step 3044, before the process ends at step 3046.

If N1 has no care-of route (NR_CoR is empty or does not exist) in step 3012, then the care-of source route to N2, from N1, is set to be equal to N2's care-of route in step 3014. That is: N1_CoSR(to N2)=N2_CoR. N1 then searches through its extended Binding Cache to check whether there is an entry (i.e. a care-of source route) for this second node in the EBC, as shown in step 3016. If no entry exists in the EBC, an entry for N2 is added to the EBC (N1_CoSR(to N2)), in step 3020 and the process ends in step 3046. If an entry exists in the EBC in step 3016, the second node entry is updated (i.e. N1_CoSR (to N2)) in N1's EBC in step 3018, before the process ends at step 3046.

N1 should then source route the packet via the care-of source route to N2 in order to achieve route optimisation, as described with reference to FIG. 21 and FIG. 22. This can be implemented in several ways, as described previously. A first way is to use the IPv6 Routing Header. In this case, the first address in the care-of source route is set as the destination address in the IPv6 header and the remaining addresses of the care-of source route (CoSR) are set in the Routing Header in the same order. A second way is for the first node to build 'n' level of encapsulation of the data packet to be sent, where 'n' is the number of addresses in the care-of source route. The encapsulation #k will have the address #k, of the ordered-list of addresses in the care-of source route, as the destination address.

Furthermore, the various steps described above need not necessarily be performed in the order they have been described. A skilled artisan would recognise that an alternative order may be used, where benefit can still be gained in the route optimisation process.

It is to be appreciated that the arrangement and specific details of interfaces, address types, routers etc. in the above embodiments are merely examples, and the invention is not limited to these examples. The invention should be viewed as capable of being applied to other aspects of the Internet or other types of data networks or protocols and subnets thereof. Furthermore, the invention may also be applied to networks other than the Internet, when such networks have subnets and access networks corresponding to those described above for the case of the Internet.

The invention, or at least embodiments thereof, tend to provide the following advantages, singly or in combination:
 (i) A data packet may be transmitted much more efficiently, using this improved route optimisation technique.
 (ii) Improved privacy of data packet transmissions, as each node in the topology is responsible in sending their own Binding Updates to their CNs and Home Agent. Hence, each node is able to decide whether it wishes to disclose its current location by sending a Binding Update in order to perform route optimisation. This is a clear advantage over [3] where privacy is not allowed.
 (iii) The security solutions defined by the IETF, to provide "address ownership" authorisation (e.g. Return Routeability), are still applicable in the context of the present invention. This is again a clear advantage over [3], which requires a new security mechanism to be introduced.
 (iv) A secured exchange of new messages (e.g. "Care-of Route Advertisement") introduced in the present invention can be very easily realised, either through shared secret (in the case of nodes belonging to the same organisation) or through a new IETF protocol such as PANA in the case of a Mobile Node (host or router) visiting a foreign network.

(v) A solution for efficient data routing in IPv6, IPv4 or similar data network protocol has been achieved, particularly for systems supporting nested network mobility.

Whilst the specific and preferred implementations of the embodiments of the present invention are described above, it is clear that one skilled in the art could readily apply variations and modifications of such inventive concepts.

Thus, a mechanism, apparatus and associated methods to support route optimisation in Network mobility, especially in the case of IPv6, have been described, whereby the disadvantages associated with known mechanisms, apparatus and associated methods have been substantially alleviated. In particular, a mechanism, apparatus and associated methods to support route optimisation in the case of nested mobility, have been described.

In the foregoing specification, the present invention has been described with reference to specific embodiments. However, one of ordinary skill in the art will appreciate that various modifications and changes may be made without departing from the spirit and scope of the present invention as set forth in the appended claims. Accordingly, the specification and drawings are to be regarded in an illustrative rather than a restrictive sense, and all such modifications are intended to be included within the scope of the present invention. Benefits, other advantages, and solutions to problems have been described above with regard to specific embodiments of the present invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims. Moreover, although the foregoing description refers to preferred embodiments, such indications of preference are not to be construed as a critical, required, or essential feature or element of any or all the claims.

The invention claimed is:

1. A method of transmitting a data packet on a communication path from a first communication node to a second communication node in a mobile network, where the second communication node is connected to the data network through at least one intermediary mobile router, the method comprising the steps of:
the second communication node determining a care-of route including a list of addresses of the at least one intermediary mobile router between said data network and said second communication node;
the second communication node sending a route message to the first communication node without any first communication node explicit request for said route message being received by the said second communication node from the first communication node, wherein said route message includes the care-of route;
the first communication node generating a preferred communication path in response to said care-of route received from said second communication node; and
the first communication node transmitting said at least one data packet from said first communication node to said second communication node via said preferred communication path.

2. The method of transmitting a data packet according to claim 1, wherein said mobile network supports nested network mobility operation and said step of transmitting includes the step of:
routing said at least one data packet via a plurality of mobile routers identified by said intermediary addresses in said mobile network.

3. The method of transmitting a data packet according to claim 1, wherein said mobile network operates in accordance with an IPv6 and/or IPv4 specification.

4. The method of transmitting a data packet according to claim 1, wherein said first communication node is a correspondent node of the said second communication node and/or said second communication node is a mobile network node.

5. The method of transmitting a data packet according to claim 1, the method further comprising the step of:
sending a care-of route advertising message, by a plurality of communication nodes in the mobile network, that includes route information related to communication nodes attached to said second communication node, so that a communication path to an intended recipient can be determined.

6. The method of transmitting a data packet according to claim 1, wherein said list of the plurality of intermediary addresses includes addresses of one or more mobile routers above the second communication node and includes a care-of address of the second communication node itself, if the second communication node is a mobile node, in a route hierarchy for delivering said data packet to an intended recipient.

7. The method of transmitting a data packet according to claim 5, the method further comprising the step of:
requesting transmission of one or more care-of route advertisement messages, containing route information of one or more IP addresses, from adjacent communication nodes when said second communication node moves to a new location within the mobile network.

8. The method of transmitting a data packet according to claim 5, the method further comprising the steps of:
extracting intermediary route messages from said route information in said care-of route advertising message at a communication node; and
transmitting said intermediary route messages to communication nodes that the extracting communication node serves.

9. The method of transmitting a data packet according to claim 8, the method further comprising the step of:
appending a route message of the communication unit to said list of intermediary routes in said care-of route advertising message at said communication node.

10. The method of transmitting a data packet according to claim 5 further comprising the step of:
sending periodically said care-of route advertising message to all or a selected number of communication nodes in the mobile network.

11. The method of transmitting a data packet according to claim 5, the method further comprising the step of:
sending a mobile network prefix advertisement message by a mobile router at a top of a routing hierarchy in the mobile network to advertise said mobile network prefix; and
determining by communication nodes in the same mobile network that they are located within the sending mobile router's mobile network.

12. The method of transmitting a data packet according to claim 1, the method further comprising the step of:
sending an extended binding update message containing route information only to communication nodes outside of the sending communication node's mobile network.

13. The method of transmitting a data packet according to claim 1, wherein the sending step includes the second communication node sending the route message when it detects that a new communication is started with the first communication node.

14. The method of transmitting a data packet according to claim 1, wherein the sending step includes the second communication node sending the route message when it decides to trigger route optimization for an ongoing communication with the first communication node.

15. The method of transmitting a data packet according to claim 1, wherein the sending step includes the second communication node sending the route message when it detects that its care-of route has changed.

16. The method of transmitting a data packet according to claim 15, wherein the care-of route has changed due to the IP mobility of one or more of its upper mobile routers connecting it to the data network.

17. The method of transmitting a data packet according to claim 1, wherein the generating step generates the preferred communication path based on at least the care-of route received from the second communication node and a second care-of route relating to the first communication node that includes a list of mobile router addresses between the first communication node and the data network.

18. A data network including a first communication node for transmitting a data packet on a communication path from the first communication node to a second communication node, where the second communication node is in a mobile network connected to the data network through at least one intermediary mobile router, the data network comprising:

the second communication node that determines a care-of route including a list of addresses of the at least one intermediary mobile router between said data network and said second communication node, and sends a route message to the first communication node without any first communication node explicit request for said route message being received from the first communication node, wherein said route message includes the care-of route; and the first communication node generates a preferred communication path in response to said care-of route received from said second communication node, and transmits said at least one data packet to said second communication node via said preferred communication path.

19. A method for building an extended binding cache for a data packet on a communication path from a first communication node to a second communication node in a mobile network, where the second communication node is connected to the data network through at least one intermediary mobile router, the method comprising the steps of:

determining, by the second communication node, a care-of route including a list of addresses of the at least one intermediary mobile router between said data network and said second communication node;

sending, by the second communication node, an extended binding update message to the first communication node without any first communication node explicit request for said update message being received by the said second communication node from the first communication node, wherein said update message includes the care-of route for messages to reach said second communication node;

receiving, from the second communication node, the extended binding update message indicating the intermediary addresses in the route for messages to reach said second communication node;

comparing said intermediary addresses of said extended binding update message with intermediary addresses, if any, of the first communication node's care-of route;

extracting at least one subsequent route of said second communication node, when said comparison fails to yield a match following previous route matches, thereby generating an extended binding cache entry indicating a preferred route to said second communication node; and transmitting said data packet from said first communication node to said second communication node via said preferred route.

* * * * *